United States Patent
Files et al.

(10) Patent No.: US 10,452,135 B2
(45) Date of Patent: Oct. 22, 2019

(54) DISPLAY DEVICE VIEWING ANGEL COMPENSATION SYSTEM

(71) Applicant: Dell Products L.P., Round Rock, TX (US)

(72) Inventors: Jace Files, Round Rock, TX (US); John Trevor Morrison, Round Rock, TX (US); Deeder Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/814,221

(22) Filed: Jul. 30, 2015

(65) Prior Publication Data
US 2017/0031434 A1    Feb. 2, 2017

(51) Int. Cl.
  *G06F 3/01*   (2006.01)
  *G06F 3/14*   (2006.01)
  *H04N 5/232*  (2006.01)
  *G09G 3/20*   (2006.01)

(52) U.S. Cl.
  CPC ............ *G06F 3/013* (2013.01); *G06F 3/1431* (2013.01); *G09G 3/2003* (2013.01); *H04N 5/23293* (2013.01); *G09G 2320/068* (2013.01); *G09G 2320/0626* (2013.01); *G09G 2354/00* (2013.01); *G09G 2360/144* (2013.01)

(58) Field of Classification Search
None
See application file for complete search history.

(56) References Cited

U.S. PATENT DOCUMENTS

| | | | | |
|---|---|---|---|---|
| 6,061,083 A | * | 5/2000 | Aritake | G02B 27/2214 348/42 |
| 8,225,229 B2 | | 7/2012 | Thorn et al. | |
| 2007/0120869 A1 | * | 5/2007 | Nishida | G09G 3/3607 345/611 |
| 2009/0169058 A1 | * | 7/2009 | Chen | G06F 3/011 382/106 |

(Continued)

OTHER PUBLICATIONS

Jong-Man Kim, Seung-Ryul Kim, Jongbin Kim, Minkoo Kim and Seung-Woo Lee, "A Liquid Crystal Display With Consistent Moving Image Quality Regardless of Viewing Angles," Optics & Laser Technology, Optics & Laser Technology 60 (2014) 34-40.

*Primary Examiner* — Aaron M Richer
(74) *Attorney, Agent, or Firm* — Haynes and Boone, LLP

(57) ABSTRACT

A display device viewing angle compensation system includes a computing device that is coupled to a display device and an image capturing device. The computing device is configured to receive at least one image from the image capturing device, analyze the at least one image to detect a first user, and determine a first user viewing angle relative to the display screen. The computing device then determines at least one display screen output modification using the first user viewing angle. The computing device then applies the at least one display screen output modification to the display device to modify at least one display screen output provided on the display screen. The at least one display screen output modification may modify a display screen brightness output, a display screen contrast output and/or a display screen color output provided on the display screen.

18 Claims, 18 Drawing Sheets

(56) References Cited

U.S. PATENT DOCUMENTS

| | | | |
|---|---|---|---|
| 2012/0069131 A1* | 3/2012 | Abelow | G06Q 10/067 348/14.01 |
| 2015/0145977 A1* | 5/2015 | Hoffman | H04N 13/0018 348/59 |
| 2015/0177906 A1* | 6/2015 | Yairi | G06T 3/0006 345/648 |

* cited by examiner

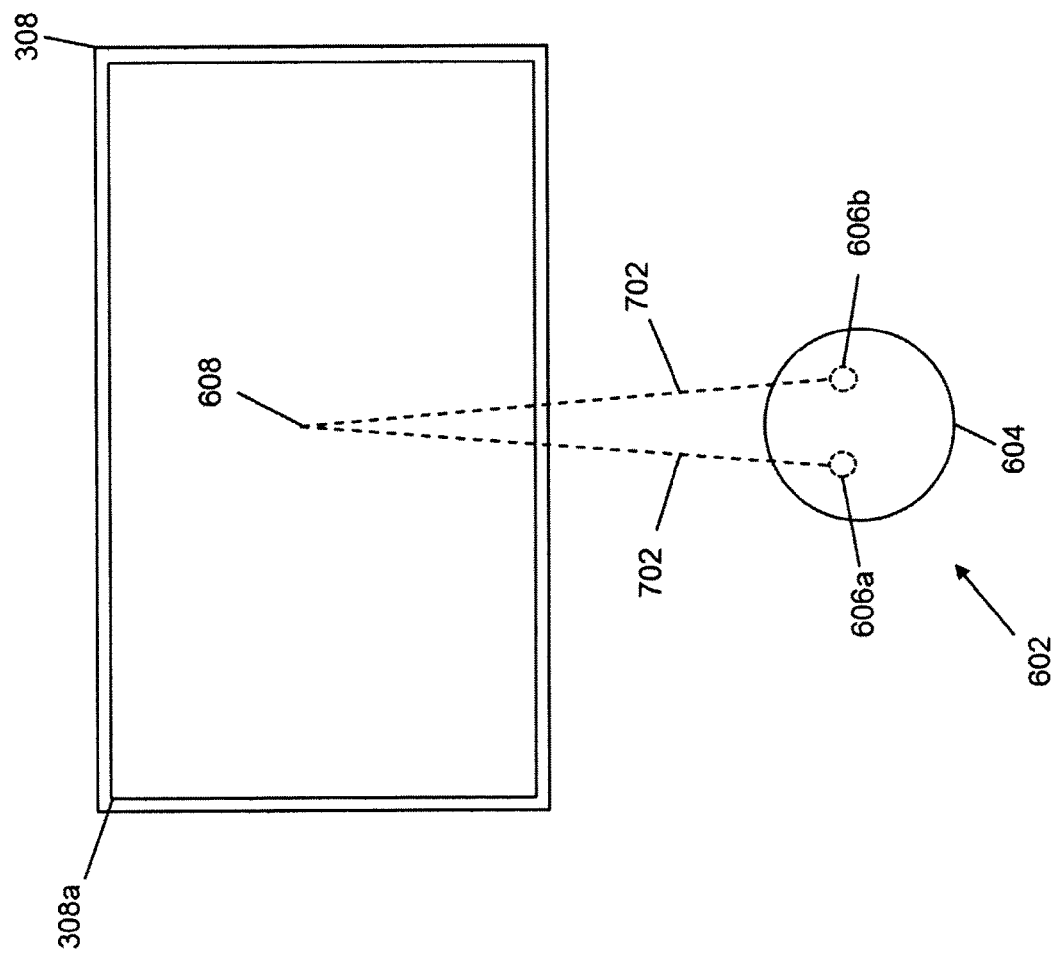

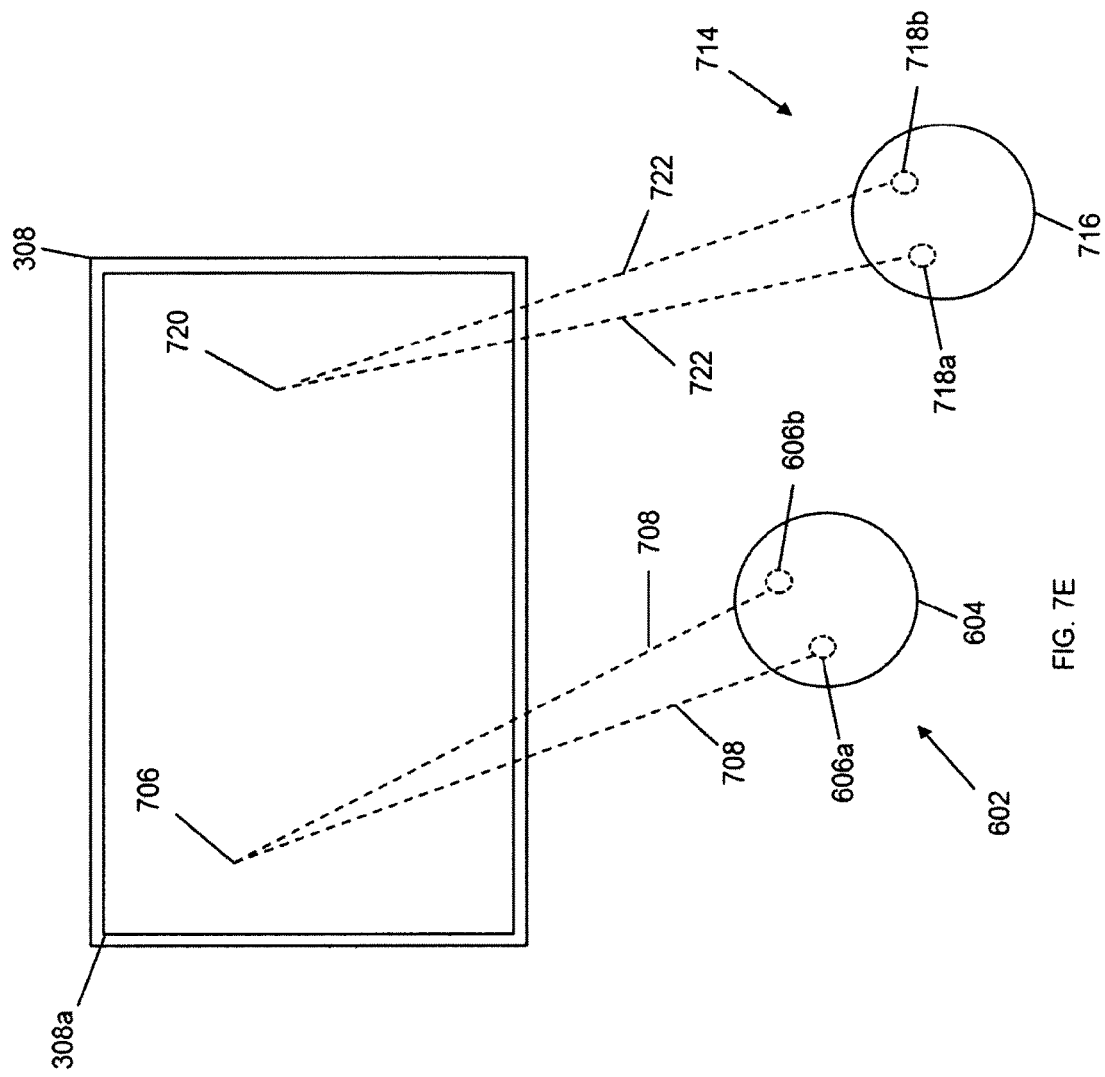

DISPLAY DEVICE VIEWING ANGEL COMPENSATION SYSTEM

BACKGROUND

The present disclosure relates generally to information handling systems, and more particularly to viewing angle compensation for display devices in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include display devices for displaying information, inputting information, and/or otherwise allowing a user to interact with the information handling system. Some display devices do not provide consistent viewing quality for users across all viewing angles. For example, with Liquid Crystal Display (LCD) devices, user-perceived display characteristics such as brightness, contrast, color, and/or other visual parameters degrade substantially at viewing angles greater than 20 degrees (i.e., relative to a 0 degree viewing angle at which the users eyes are perpendicular to the screen of the LCD device). While such viewing angle degradation can cause issues with conventional display device configurations, those configurations in which the screen of the display device is positioned relatively close and orientated substantially perpendicularly to the user typically keep the viewing angle degradation to a minimum (i.e., unless the user is relatively far from and off center with respect to the display device). However, new display device configurations have been proposed that will present such viewing angle degradations in relatively more common-use situations.

For example, the use of secondary display/input devices with a primary display device has recently been incorporated into some information handling systems. In such systems, the primary display device is configured substantially as discussed above in conventional display device configurations (i.e., with the screen of the primary display device oriented substantially perpendicularly to the user), and the secondary display/input device is positioned adjacent the primary display device with the screen of the secondary display/input device oriented substantially perpendicularly to the screen of the primary display device. The screen of the secondary display/input device may then be used to input information into the information handling system and well as view information from the information handling system. However, with the screen of the secondary display/input device oriented as discussed above, the user of the information handling system will experience the viewing angle degradation in a variety of common-use situations, which can result in a negative user experience with regard to the secondary display/input device.

Accordingly, it would be desirable to provide a display device viewing angle compensation system.

SUMMARY

According to one embodiment, an information handling system (IHS) includes a display screen output; an image capturing device input; a processing system that is coupled to the display screen output and the image capturing device input; and a memory system that is coupled to the processing system and that includes instructions that, when executed by the processing system, cause the processing system to provide a viewing angle compensation engine that is configured to: receive at least one image through the image capturing device input; analyze the at least one image to detect a first user and determine a first user viewing angle relative to a display screen that is coupled to the display screen output; determine at least one display screen output modification using the first user viewing angle; and provide the at least one display screen output modification through the display screen output to modify at least one display screen output provided on the display screen.

BRIEF DESCRIPTION OF THE DRAWINGS

FIG. 7C is a schematic top view illustrating the user viewing a display device in the display device viewing angle compensation system of FIG. 7A.

FIG. 7E is a schematic top view illustrating the user and an additional user viewing the display device in the display device viewing angle compensation system of FIG. 7D.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
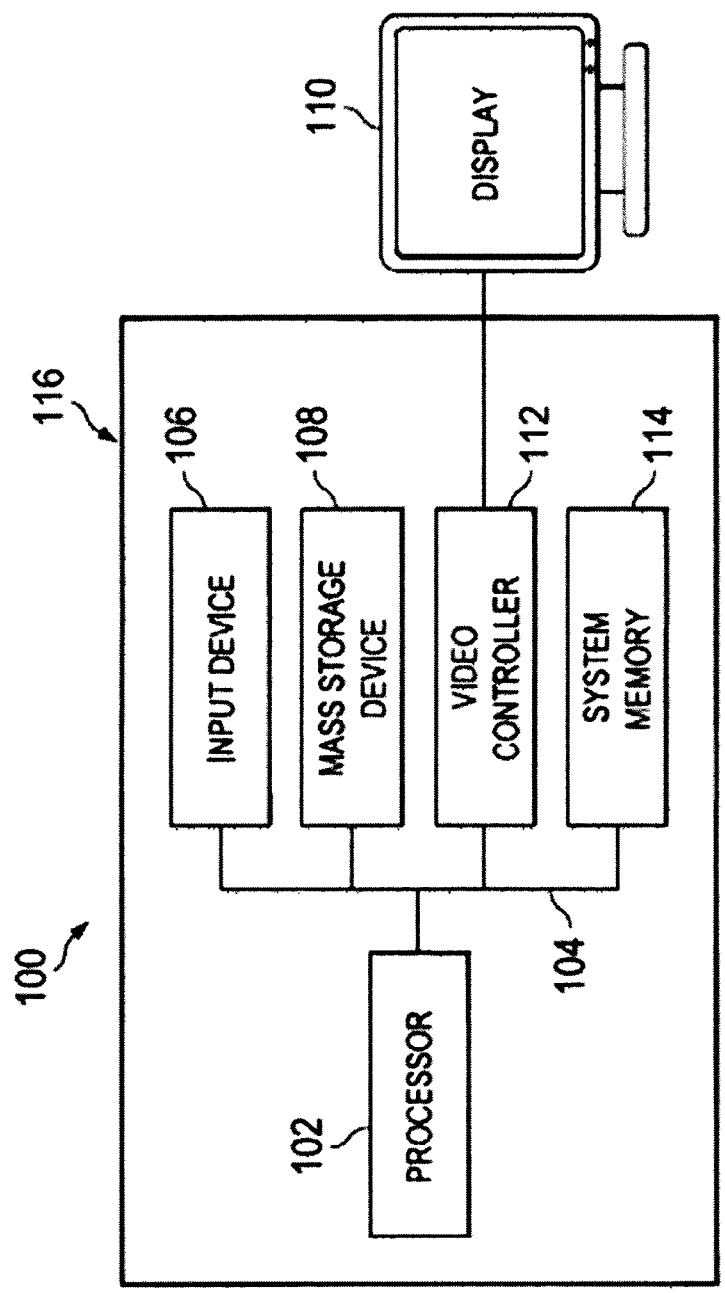
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
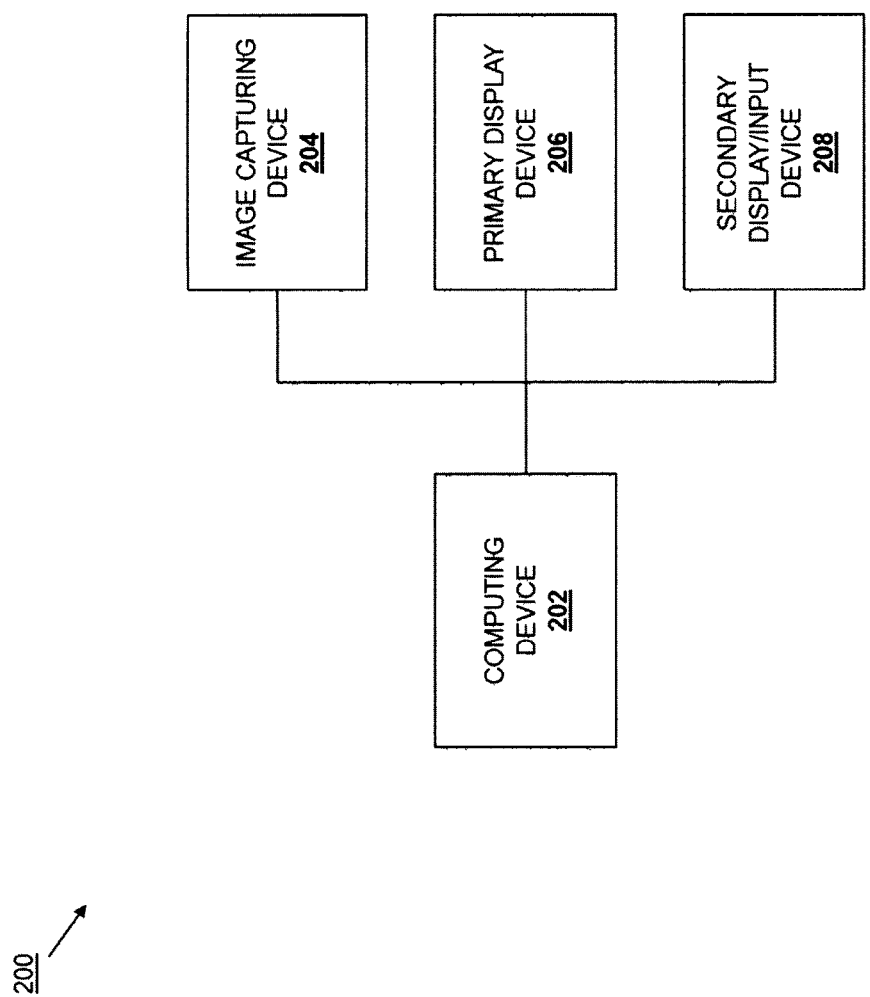
FIG. 2 is a schematic view illustrating an embodiment of a display device viewing angle compensation system.

Referring now to FIG. 2, an embodiment of a display device viewing angle compensation system 200 is illustrated. In an embodiment, the display device viewing angle compensation system 200 may be the IHS 100 discussed above with reference to FIG. 1 and/or may include some or all of the components of the IHS 100. In the embodiments illustrated and discussed below, the display device viewing angle compensation system 200 is distributed across multiple IHSs. However, in some embodiments, devices illustrated and described below may be combined such that the display device viewing angle compensation system 200 is distributed across fewer IHS and, in some cases, included in a single IHS. The display device viewing angle compensation system 200 includes a computing device 202 that may be the IHS 100 discussed above with reference to FIG. 1 and/or may include some or all of the components of the IHS 100. For example, the computing device 202 may be a desktop computer, a laptop computer, a tablet computer, a mobile phone, a server, and/or a variety of other computing devices known in the art. The computing device 202 is coupled to image capturing device 204. In different embodiments, the image capturing device 204 may be a two-dimensional image capturing camera, a three-dimensional image capturing camera, a infrared image capturing camera, a depth capturing camera, and/or a variety of other image or data capturing devices known in the art that provide the image or data capturing functionality discussed below. In addition, in some embodiments, the image capturing device 204 and/or a processing system coupled to the image capturing device may include eye scanning, eye tracking, and/or other user view capturing engines known in the art, as discussed in further detail below.

The computing device 202 is also coupled to a primary display device 206 and a secondary display/input device 208. In the embodiments illustrated and discussed below, the primary display device 206 is provided by a conventional computer display system that is typically oriented vertically such that a display screen on the primary display device 206 is substantially perpendicular to the user during common-use situations. However, in other embodiments, the functionality of the display device viewing angle compensation system 200 that is applied to the secondary display/input device 208 may be applied to the primary display device 206 while remaining within the scope of the present disclosure. In the embodiments illustrated and discussed below, the secondary display/input device 208 is provided by a "touch sensitive" display system (e.g., utilizing resistive technology, surface acoustical wave technology, capacitive technology, infrared grid technology, infrared acrylic projection technology, optical imaging technology, dispersive signal technology, acoustic pulse recognition technology, and/or a variety of "touch sensitive" technologies known in the art) that is oriented horizontally such that the display screen on the secondary display/input device 208 is substantially perpendicular to the display screen on the primary display device during common-use situations. While the secondary display/input device 208 is discussed below as including such "touch sensitive" functionality, such functionality may include user/display screen interactions that are not necessarily enabled by the user physically engaging the display screen (e.g., subsystems that capture user gestures and the like without the user actually engaging the display screen will fall within the scope of the present disclosure), and in some embodiments that functionality may be omitted while still providing the user viewing angle benefits detailed below. Furthermore, while a specific configuration of the primary display device 206 and the secondary display/input device 208 in the display device viewing angle compensation system 200 is illustrated and described herein, in other embodiments, the teachings of the present disclosure may be applied to a single display device while remaining within the scope of the present disclosure.

Figure 3:
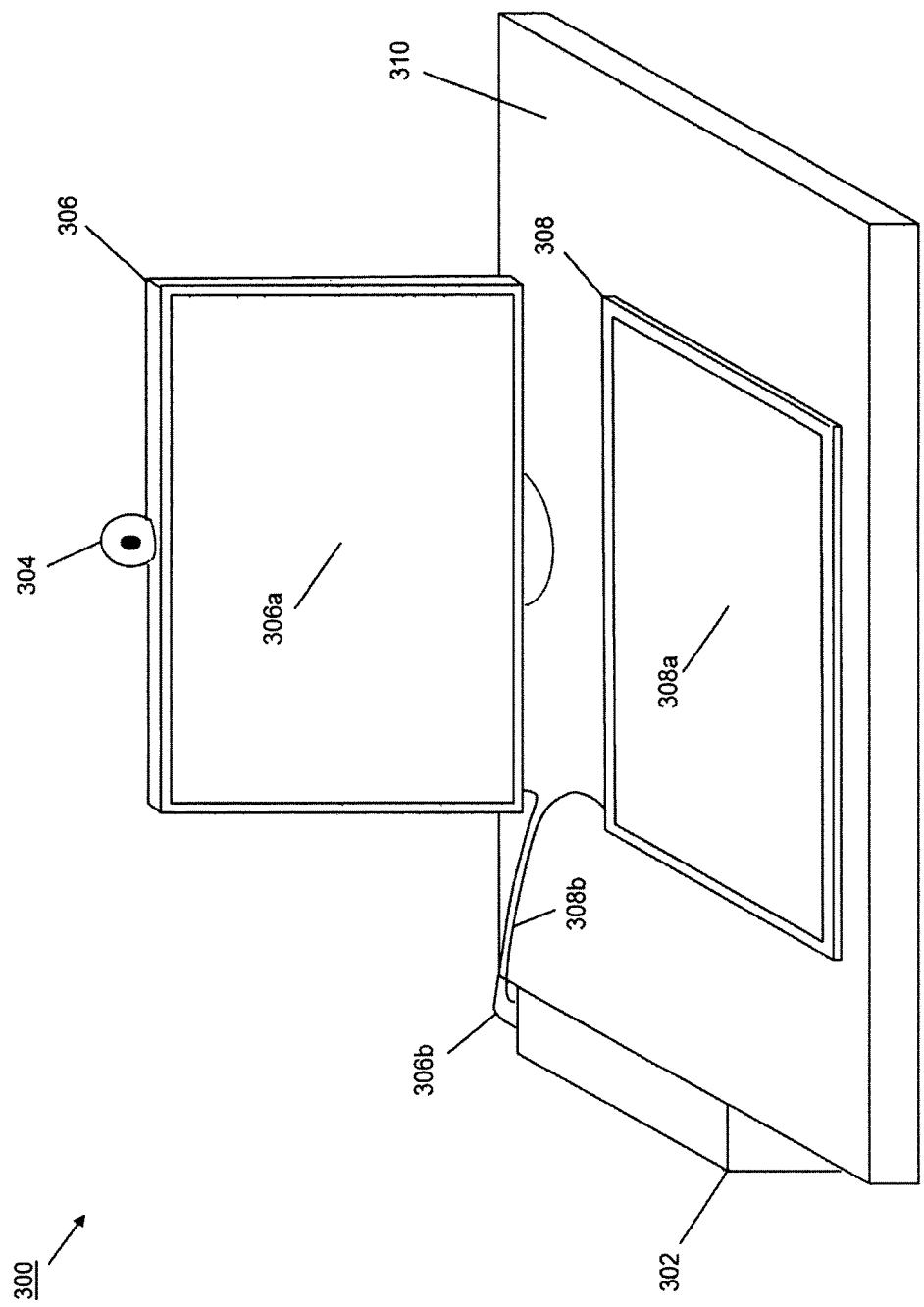
FIG. 3 is a perspective view illustrating an embodiment of the display device viewing angle compensation system of FIG. 2.

Referring now to FIG. 3, an embodiment of a display device viewing angle compensation system 300 is illustrated that provides a specific example of the display device viewing angle compensation system 200 discussed above with reference to FIG. 2. The display device viewing angle compensation system 300 includes a desktop/tower computer 302 that may be the computing system 202 of FIG. 2. As such, the desktop/tower computer 302 may be the IHS 100 discussed above with reference to FIG. 1 and may include a chassis that houses a processing system, a memory system, a video controller, a storage system, a communications system, a variety of connectors (e.g., video connectors such as High Definition Multimedia Interface (HDMI) connectors), and/or other desktop/tower computer components known in the art. A three-dimension image capturing camera 304 that may be the image capturing device 204 of FIG. 2 is coupled a primary monitor 306 that may be the primary display device 206 of FIG. 2. The primary monitor 306 includes a display screen 306a and is coupled to the desktop/tower computer 302 via a connector 306b (e.g., an HDMI connector that is coupled to an HDMI port on the desktop/tower computer 302). A secondary touch-sensitive monitor 308 that may be the secondary display/input device 208 of FIG. 2 includes a display screen 308a and is coupled to the desktop/tower computer 302 via a connector 308b (e.g., an HDMI connector that is coupled to an HDMI port on the desktop/tower computer 302). In the illustrated embodiment, the three-dimension image capturing camera 304 is integrated with the primary monitor 306 and connected to the desktop/tower computer 302 via the connector 306b. However, in other embodiments, the three-dimension image capturing camera 304 may be integrated with the secondary touch-sensitive monitor 308 or the desktop/tower computer 302, may be provided as a stand-alone camera that connects to the desktop/tower computer 302 via a dedicated connector, and/or may be provided in the display device viewing angle compensation system 300 in any other manner known in the art.

In the illustrated embodiment, the primary monitor 306 and the secondary touch-sensitive monitor 308 are positioned on a surface 310 (e.g., a desk) and described below as oriented such that the display screen 306a on the primary monitor 306 is substantially perpendicular to the display screen 308a on the secondary touch-sensitive monitor 308. However, one of skill in the art in possession of the present disclosure will recognize that each of the primary monitor 306 and the secondary touch-sensitive monitor 308 may include orientation manipulation subsystems that are configured to adjust the orientation of the display screens 306a and 308a relative to the surface 310. For example, the "vertical" orientation of the display screen 306a on the primary monitor 306 may be provided when the display screen 306a is oriented substantially perpendicularly (e.g., at an angle of 90 degrees) to the surface 310, and the orientation manipulation subsystem on the primary monitor 306 may be configured to provide for changes in that orientation (e.g., +/−25 degrees), rotation of the primary monitor 306 and its display screen 306a about an axis that is perpendicular to the surface 310, vertical adjustments of the primary monitor 306 and its display screen 306a to change the distance between any point on the display screen 306a and the surface 310, and/or provide any other display screen orientations known in the art.

Similarly, the "horizontal" orientation of the display screen 308a on the secondary touch-sensitive monitor 308 may be provided when the display screen 308a is oriented substantially parallel (e.g., at an angle of 0 degrees) to the surface 310 (i.e., "flat" on the surface 310 as illustrated in FIG. 3), and the orientation manipulation subsystem on the secondary touch-sensitive monitor 308 may be configured to provide for changes in that orientation (e.g., +0-45 degrees as measured from an edge of the secondary touch-sensitive monitor 308), rotation of the secondary touch-sensitive monitor 308 and its display screen 308a about an axis that is perpendicular to the surface 310, vertical adjustments of the secondary touch-sensitive monitor 308 and its display screen 308a to change the distance between any point on the display screen 308a and the surface 310, and/or provide any other display screen orientations known in the art. Thus, while reference to the display screens 306a and 308a being oriented substantially perpendicularly to each other is made occasionally herein, it should be understood that the orientation of the primary monitor 306 and the secondary touch-sensitive monitor 308 (and their display screens 306a and 306b) may be adjusted in a variety of manners as desired by a user while remaining within the scope of the present disclosure.

Furthermore, while the functionality of the display device viewing angle compensation systems of the present disclosure is described generally as being provided by a processing system in the desktop/tower computer 302, one of skill in the art in possession of the present disclosure will recognize that such functionality may be enabled by a processing system in the secondary touch-sensitive monitor 308 or other devices/systems while remaining within the scope of the present disclosure. As such, in embodiments in which the three-dimension image capturing camera 304 is integrated with the secondary touch-sensitive monitor 308, the secondary touch-sensitive monitor 308 may provide the display device viewing angle compensation system in a single chassis and as a single device that enables the functionality discussed below.

Figure 4:
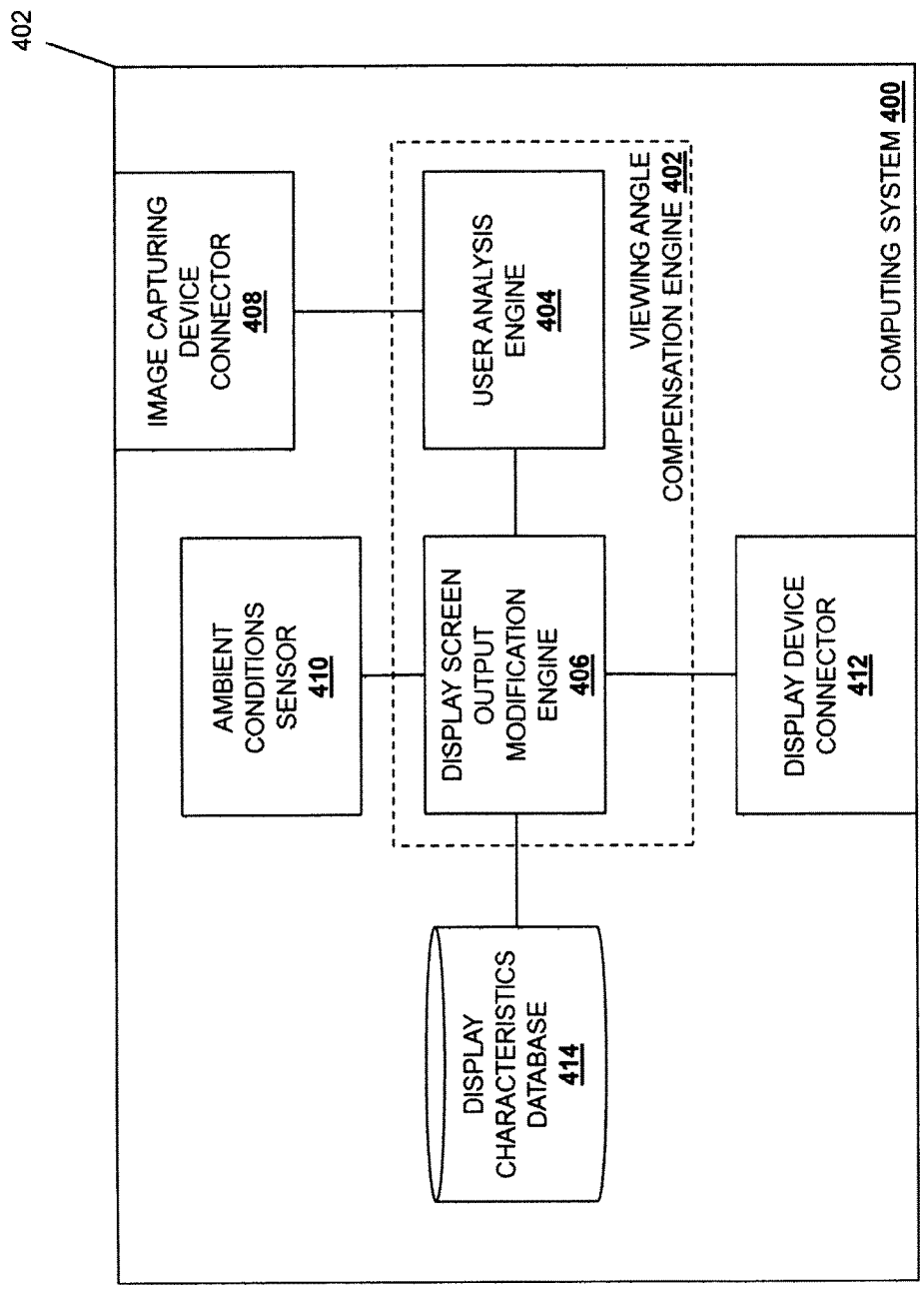
FIG. 4 is a schematic view illustrating an embodiment of a computing device used in the display device viewing angle compensation system of FIGS. 2 and 3.

Referring now to FIG. 4, an embodiment of a computing system 400 is illustrated. In an embodiment, the computing system 400 may be the IHS discussed above with reference to FIG. 1 and/or may include some or all of the components of the IHS 100. In specific embodiments, the computing system 400 may be the computing device 202 discussed above with reference to FIG. 2 and/or the desktop/tower computer 302 discussed above with reference to FIG. 3. However, as discussed above, the computing system 400 may be provided in the secondary display/input device 208 discussed above with reference to FIG. 2 and/or the secondary touch-sensitive monitor 308 discussed above with reference to FIG. 3. The computing system 400 includes a chassis 402. The chassis 402 may house a processing system (not illustrated, but which may be the processor 102 discussed above with reference to FIG. 1) and a memory system (not illustrated, but which may be the system memory 114 discussed above with reference to FIG. 1) that includes instructions that, when executed by the processing system, cause the processing system to provide a viewing angle compensation engine 402 that is configured to perform the functions of the viewing angle compensation engines and computing systems discussed below. In the illustrated embodiment, the functionality of the viewing angle compensation engine 402 is separated into a user analysis engine 404 and a display screen output modification engine 406 for clarity of illustration and discussion. The user analysis engine 404 is coupled to an image capturing device connector 408 (e.g., via a coupling between an image capturing device input on the processing system and the image capturing device connector 406) that may couple to the image capturing device 204 of FIG. 2 and/or the three-dimension image capturing camera 304. For example, the image capturing device connector 408 may be an external connector (e.g., an HDMI) connector that connects to cabling that is coupled to the image capturing device or a device that includes the image capturing device. In another example, the image capturing device connector 408 may be an internal device connector (e.g., coupled to the processing system) when the image capturing device is integrated with the computing system 400.

The display screen output modification engine 406 may also be coupled to an ambient conditions sensor 410 (e.g., via a coupling between the processing system and the ambient conditions sensor 410). In the embodiments discussed below, the ambient conditions sensor 410 includes an ambient light sensor that is configured to detect and report ambient light conditions that can affect user-perceived display screen output characteristics. However, the ambient conditions sensor 410 may also include other sensors that detect and report other ambient conditions that can affect user-perceived display screen output characteristics. The display screen output modification engine 406 may also be coupled to a display device connector 412 (e.g., via a coupling between a display device output on the processing system and the display device connector 412) that may couple to the secondary display/input device 208 of FIG. 2 and/or the secondary touch-sensitive monitor 308. For example, the display device connector 412 may be an external connector (e.g., an HDMI) connector that connects to cabling that is coupled to the secondary display/input device 208. In another example, the display device connector 412 may be an internal device connector (e.g., coupled to the processing system) when the computing system 400 is integrated with the secondary display/input device 208.

The display screen output modification engine 406 may also be coupled to a storage device (not illustrated, but which may be the storage device 108 of FIG. 1 that may be coupled to the processing system) that includes a display characteristics database 414. As discussed below, in some embodiments, the display characteristics database 414 may store information that allows for the display screen output modifications that may be applied to the secondary display/input device 208 to modify the display screen output provided on its display screen. One of skill in the art in possession of the present disclosure will recognize that the computing system 400 may include several components that have not been illustrated for clarity. For example, connectors for the primary display device 206/computer display system 306 have not been illustrated as, in the embodiments discussed below, the viewing angle compensation engine 402 does not apply its functionality to that display device/system. However, application of such functionality to the primary display device 206/computer display system 306 is envisioned as falling within the scope of the present disclosure, and in such embodiments the connection to that display device/system may be provided substantially as discussed above.

Figure 5:
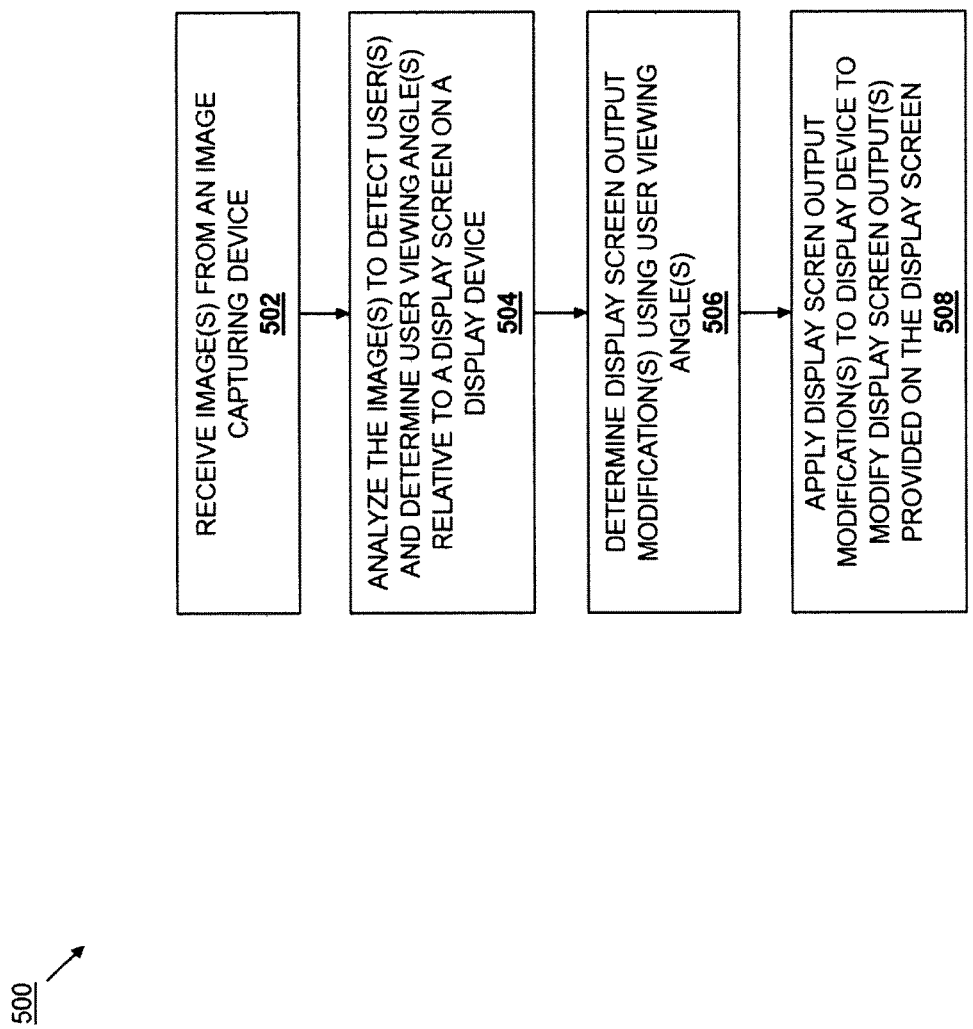
FIG. 5 is a flow chart illustrating an embodiment of a method for compensating for a viewing angle with a display device.

Referring now to FIG. 5, an embodiment of a method 500 for compensating for viewing angle with a display device is illustrated. As discussed below, a user using a display device may view the display screen of that display device (or a point on that display screen) at a user viewing angle that is known to degrade user-perceived display screen output characteristics such as brightness, contrast, and color. The method 500 utilizes the systems taught herein to determine that user viewing angle via detection of the user and determination of the distance of the user from the display screen as well as, in some embodiments, the direction in which the user is looking at the display screen and/or the point on the screen at which the user is looking. The method then determines the associated display screen output modifications that will compensate for the user-perceived display screen output characteristic degradation resulting from that user viewing angle, and applies those display screen output modifications to the display device to modify the display screen outputs of the display screen so that user will not perceive degradation of the display screen output characteristics at that user viewing angle.

The method 500 is described below with reference to the display device viewing angle compensation system 300 discussed above in FIG. 3, but one of skill in the art in possession of the present disclosure will recognize that it may be applied to the other display device viewing angle compensation systems and/or modifications to those systems while remaining within the scope of the present disclosure. However, in the embodiments discussed below, a user is described as utilizing the display screen 308a on the secondary touch-sensitive monitor 308 as a display/input device that provides a "work surface" or "smart desktop" that may be coordinated with the primary monitor 306 in order to realize a variety of functionality with regard to system applications including engineering and architecture applications (e.g., product design, prototyping, 3D design, product visualization, etc.), media and entertainment applications (e.g., content creation, photo manipulation, illustration, animation, etc.), scientific applications (e.g., mapping, scientific result illustration, data immersion, etc.), financial applications (e.g., trading, financial result illustration, data immersion, etc.), gaming applications (e.g., real time strategy gaming, split screen gaming providing different controls via the primary monitor 306 and secondary touch-sensitive monitor 308), as well as general computing applications (e.g., personal workspaces, collaborative workspaces, command and control systems, etc.). As such, in some embodiments, the secondary touch-sensitive monitor 308 may be utilized with the primary monitor 306 to provide a second display screen for browsing, augmentation of the first display screen on the primary monitor 306, collaboration with the first display screen on the primary monitor 306, different gaming functionality than first display screen on the primary monitor 306, manipulation of elements on the first display screen on the primary monitor 306, as well as any other functionality that would be apparent to one of skill in the art in possession of the present disclosure. Furthermore, as discussed above, the "touch-sensitive" functionality described herein may be combined with or replaced by input functionality that does not actually require the user to physically engage the display screen 308a of the secondary touch-sensitive monitor 308a (e.g., the user-gesture recognition systems discussed above), and in some embodiments may be omitted entirely (e.g., when the teachings of the present disclosure are applied to a display device/display screen with no input functionality).

Prior to the start of the method 500, the display device viewing angle compensation system 300 may be powered on, reset, and/or otherwise initialized (e.g., by powering on the desktop/tower computer 302 and/or each of the components in the display device viewing angle compensation system 300) such that the primary monitor 306/three-dimensional image capturing camera 304 and the secondary touch-sensitive monitor 308 are provided power through the connectors 306a and 306b. Upon initialization, the three-dimensional image capturing camera 304, the secondary touch-sensitive monitor 308, and/or the other systems components may communicate in order to "pair", synchronize, and/or otherwise coordinate such that the functionality discussed below may be realized. In some examples, the three-dimensional image capturing camera 304 and/or the secondary touch-sensitive monitor 308 may be wireless devices that may pair with each other and/or the desktop/tower computer 302 using wireless communication methods such as Bluetooth, Near Field Communication (NFC), and/or other methods known in the art. Furthermore, the initialization of the display device viewing angle compensation system 300 may include the viewing angle compensation engine 402 receiving images and/or data from the image three-dimensional image capturing camera 304 and analyzing those images (e.g., using image recognition techniques and/or spatial determination techniques) to detect the secondary touch-sensitive monitor 306, determine the relative location of the secondary touch-sensitive monitor 306 with respect to the three-dimensional image capturing camera 304, and/or determine any other information necessary to enable the functionality discussed below. As such, information detected and/or determined upon initialization may be stored in the display characteristics database 414 for use in the method 500 discussed below.

The method 500 begins at block 502 where at least one image is received from an image capturing device. In an embodiment, the three-dimensional image capturing camera 304 may capture at least one image of and/or data describing the environment that includes the secondary touch-sensitive monitor 306. For example, at block 502 the user analysis engine 404 in the viewing angle compensation engine 402 may receive image(s) and/or data through the image capturing device connector 408 from the three-dimensional image capturing camera 304. As discussed above, while the display device viewing angle compensation system 300 is described below as primary receiving and analyzing images to detect the user and determine the user viewing angle, in other embodiments data other than images may be captured (e.g., depth data, acoustic data, light data, infrared data, and/or other data known in the art) and utilized similarly to the images discussed below to detect the user and determine the user viewing angle while remaining within the scope of the present disclosure. Furthermore, while the three dimensional image capturing camera 304 is illustrated in FIG. 3 as a single camera, multiple cameras and camera images may be utilized in the method 500 while remaining within the scope of the present disclosure.

Figure 6A:
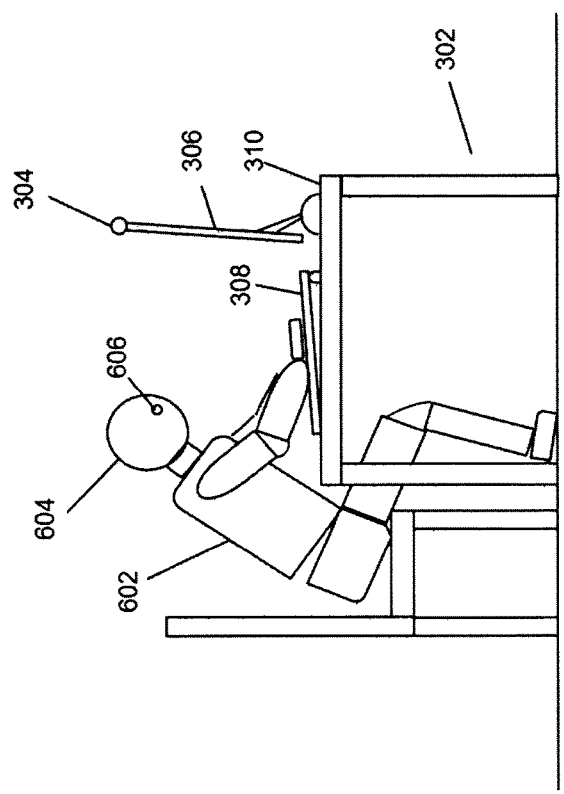
FIG. 6A is a schematic side view illustrating a user using the display device viewing angle compensation system of FIG. 3.
Figure 6B:
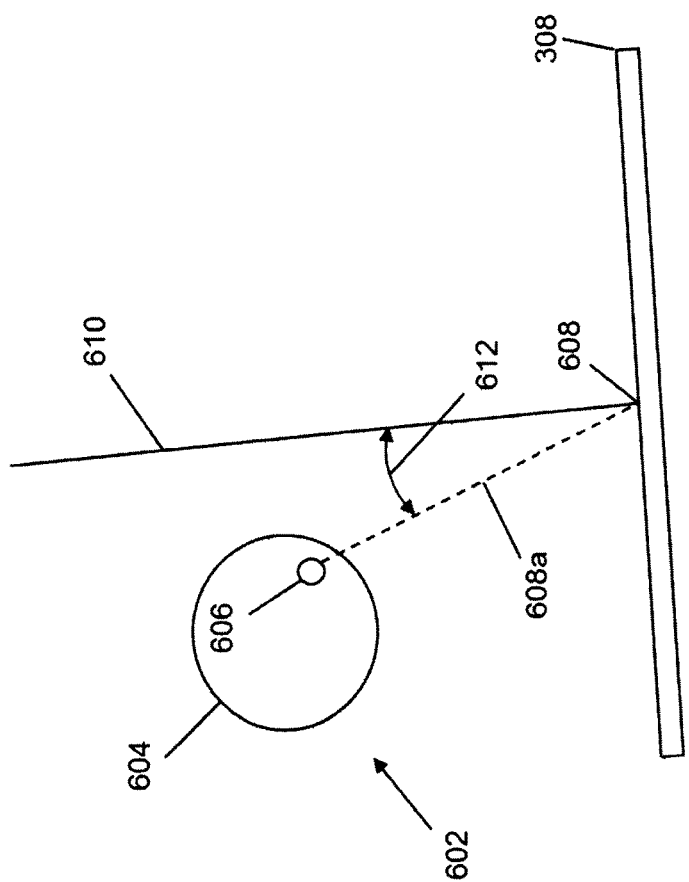
FIG. 6B is a schematic side view illustrating the user viewing a display device in the display device viewing angle compensation system of FIG. 6A.
Figure 6C:
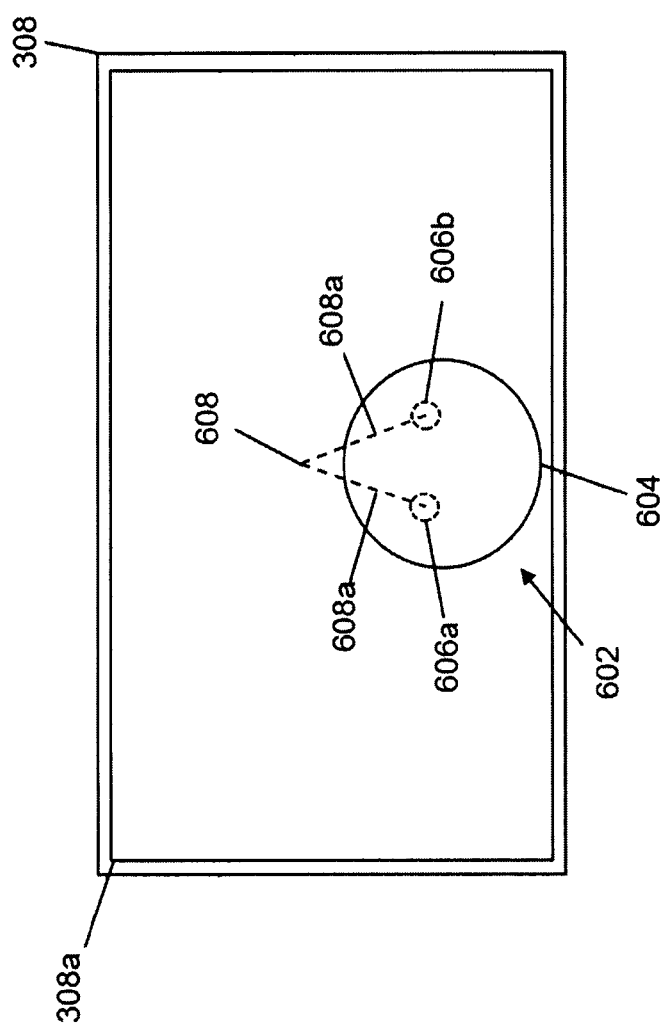
FIG. 6C is a schematic top view illustrating the user viewing a display device in the display device viewing angle compensation system of FIG. 6A.

Referring now to FIGS. 6A, 6B, and 6C, an embodiment of a first user viewing angle orientation 600 is illustrated in which a user 602 is using the display device viewing angle compensation system 300 in the first user viewing angle orientation 600. In the embodiment illustrated in FIG. 6A, the user 602 includes a head 604 and eyes 606, and is illustrated utilizing the secondary touch-sensitive monitor 308 in the first user viewing angle orientation 600 such that user 602 is leaning over the edge of the surface 310 (i.e., the desk) and the head 604 of the user 602 is positioned over the display screen 308a of the secondary touch-sensitive monitor 308 with the eyes 606 of the user 602 looking down on the display screen 308a. FIG. 6A illustrates an embodiment of the secondary touch-sensitive monitor 308 in which an orientation manipulation subsystem has been utilized to orient the display screen 308a at an angle to the surface 310 such that the display screen 308a is "tilted" towards the user 602. In a variety of common-use situations, angles of 1-5 degrees between the display screen 308a to the surface 310 have been found to optimize user experience with regard to the secondary touch-sensitive monitor 308, although as discussed above other angles will fall within the scope of the present disclosure. However, in some embodiments the angle of the display screen 308a relative to the surface 310 may be captured, detected, and/or otherwise determined during the initialization process discussed above. In other embodiments, that angle may be determined from the images captured at block 502.

FIGS. 6B and 6C illustrate different views of the user 602 utilizing the secondary touch-sensitive monitor 308 in the first user viewing angle orientation 600 illustrated in FIG. 6A. FIG. 6B illustrates a side view of the relative position of the head 604 of the user 602 and the secondary touch-sensitive monitor 308, as well as the eyes 606 of the user 602 viewing a portion 608 of the display screen 308a on the secondary touch sensitive monitor 308 along a first user viewing path 608a. As discussed above, a zero degree user viewing angle may be defined as a viewing angle that is perpendicular to the display screen 308a, and that zero degree viewing angle is illustrated in FIG. 6B by a reference viewing angle line 610. As such, FIG. 6B illustrates a first user viewing angle 612 that is measured between the first user viewing path 608a and the reference viewing angle line 610. FIG. 6C illustrates a top view of the relative position of the head 604 of the user 602 and the secondary touch-sensitive monitor 308, as well as the eyes 606a and 606b of the user 602 viewing the portion 608 of the display screen 308a on the secondary touch sensitive monitor 308 along the first user viewing path 608a. As discussed below, the viewing angle compensation engine 402 may be configured to detect each of the eyes 606a and 606b of the user 602 and/or otherwise determine the direction the eyes 606a and 606b of the user 602 are looking in and/or the portion 608 of the display 308a that the eyes 606a and 606b of the user 602 are looking at, and FIG. 6C illustrates a schematic view of the directionality of the view of the user 602. While the first viewing angle 612 is illustrated in FIG. 6B as being measured along a single plane (i.e., a vertical plane that is parallel to both of the side edges of the display screen 308a), one of skill in the art in possession of the present disclosure will recognize that the first user viewing angle may include a vertical component (e.g., measured along a vertical plane that is parallel to both of the side edges of the display screen 308a) and a horizontal component (e.g., measured along a horizontal plane that is parallel to both of the top edge and the bottom edge of the display screen 308a).

At block 502, the user analysis engine 404 in the viewing angle compensation engine 402 may receive image(s) and/or data through the image capturing device connector 408 from the three-dimensional image capturing camera 304 of the user 602 in the first user viewing angle orientation 600 illustrated in FIGS. 6A, 6B, and 6C. As discussed below, the images and/or data received by the user analysis engine 404 may differ depending on the image capturing device 204 utilized, the functionality enabled in the viewing angle compensation engine 402, the processing power provided by the processing system, and/or other factors known in the art. However, the teachings of the present disclosure are envisioned as being applicable and enabled by a wide variety of different systems with different levels of image and/or data capture, processing power, and image/data analysis functionality known in the art. For example, the image or data received at block 502 may be a conventional two-dimensional image, a three dimensional image (e.g., with depth data or metadata that describes the relative locations of elements in the image), an eye tracking data that details information about the eyes of a user captured in the image, as well as a variety of non-image data that may indicate depth, user size, user head and/or eye locations, and/or other information that may be used to enable the functionality discussed below.

The method 500 then proceeds to block 504 where the image(s) are analyzed to detect one or more users and determine one or more user viewing angles relative to a display screen on a display device. In an embodiment, the user analysis engine 404 in the viewing angle compensation engine 402 may analyze the image(s) and/or data received at block 502 in order to detect users and determine user viewing angles for each of those users. With reference to FIGS. 6A, 6B, and 6C, user analysis engine 404 may analyze the image(s) and/or data received at block 502, detect the user 602, and determine the first user viewing angle 612. For example, the display device viewing angle compensation system may be implemented with a relative simple image capturing or other user data acquisition device (e.g., a two-dimensional camera that captures still or video images) and a relatively simple user analysis engine 404 and/or processing system, and at block 502 the image(s) may be analyzed to detect a user (e.g., via a detectable user shape in the image), estimate a user distance from the secondary touch-sensitive monitor 308, and estimate the first viewing angle 612 from that user distance. Such analysis may include detecting a user shape, determining a user size of that user shape, using that user size (e.g., via data included in the display characteristics database 414) to estimate the user distance from the secondary touch-sensitive monitor 308 (e.g., features of the detected user 602 may be used to determine whether the user 602 is an adult or child, determine the relative location of that user 602 to the secondary touch-sensitive monitor 308, and/or perform other analysis), and use the user distance to determine the first user viewing angle 612.

Different enhancements to estimation of the first user viewing angle 612 include a user analysis engine 404 that is configured to distinguish the head 604 of the user 602, distinguish the eyes 606 of the user 602, estimate the age of the user 602, and/or determine other features of the user 602 that assist in estimating the distance of the head 604 of the user 602 from the secondary touch-sensitive monitor 308, the distance of the eyes 606 of the user 602 from the secondary touch-sensitive monitor 308, and/or determine other data that provides for a more accurate estimate of the first user viewing angle 612 from a two-dimensional image received from the image capturing device. For example, the distinguishing of the head 604 of the user 602 along with an estimation of the size of the user 602 (which may be performed based on features in the image, which may default to an average user size of the secondary touch-sensitive monitor 308, and/or which may be performed in a variety of other manners) may provide for the estimation of the distance of the head 604 of the user 602 from the display screen 308a of the secondary touch-sensitive monitor 308, and that distance along with the relative locations of the head 604 of the user 602 and the display screen 308a may then be used to estimate the first user viewing angle 612. One of skill in the art in possession of the present disclosure will recognize how the distinguishing of other features (e.g., the eyes 606 of the user 602) from the image may provide for more accurate estimations of the first user viewing angle 612.

In other examples, the display device viewing angle compensation system may be implemented with a relative sophisticated image capturing or other user data acquisition device (e.g., a three-dimensional camera that captures 3D still or video images, a depth capturing device that can determine relative distances between objects in its viewing range, etc.) and a relatively sophisticated user analysis engine 404 and/or processing system (e.g., an engine/processing system configured to perform image recognition techniques to identify objects in images, capture eye details from users to determine viewing directions of those users, etc.), and at block 502 the image(s) may be analyzed to detect a user, determine a user distance from the secondary touch-sensitive monitor 308, and/or determine the first viewing angle 612. Such analysis may include recognizing the user 602 in the image, detecting the user distance from the secondary touch-sensitive monitor 308, and/or detecting the first user viewing angle 612.

One of skill in the art in possession of the present disclosure will recognize that such sophisticated devices and engine/processing systems may be utilized to estimate and/or determine the first user viewing angle 612 more accurately than the relatively simple devices and/or engine/processing systems discussed above. Furthermore, such sophisticated devices and/or engines/processing systems may provide images and or data (e.g., images that may be analyzed to retrieve highly accurate determinations of the distance of the head 604 and/or eyes 606 of the user 602 from the secondary touch-sensitive monitor 308, data indicative of highly accurate measurements of the distance of the head 604 and/or eyes 606 of the user 602 from the secondary touch-sensitive monitor 308, etc.) that allows for the accurate determination of the first user viewing angle 612. Thus, one of skill in the art in possession of the present disclosure will recognize that display device viewing angle compensation systems utilizing different types of components may be provided using the teachings of the present disclosure to provide different levels of accuracy in determining user viewing angles relative to the display screen on the display device, and the benefits described herein may be realized to different degrees based on that accuracy. Furthermore, as discussed above, the first user viewing angle 612 may include both a vertical component (e.g., a component of the first user viewing angle 612 that measures the angle between the user and the zero degree user viewing angle in a vertical plane) and horizontal component (e.g., a component of the first user viewing angle 612 that measures the angle between the user and the zero degree user viewing angle in a horizontal plane), and those vertical and horizontal components may be estimated or determined to various degrees of accuracy using the techniques discussed above.

Figure 6D:
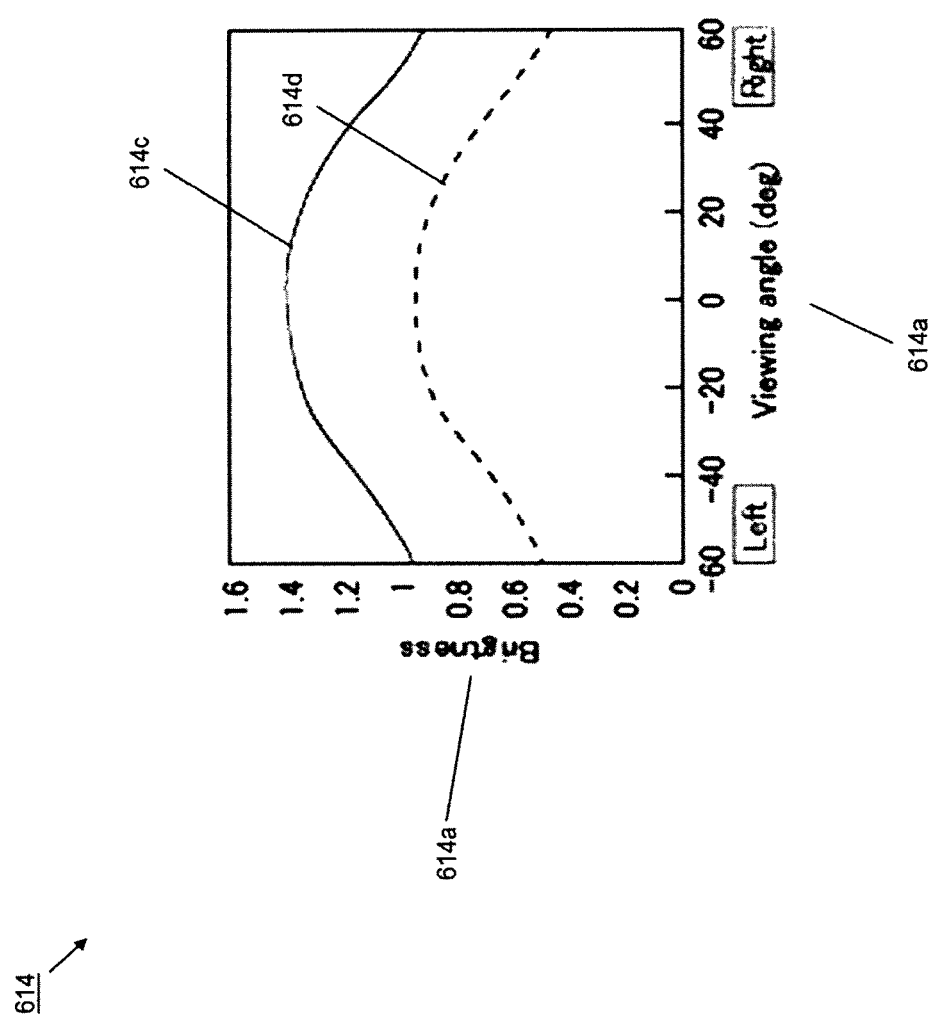
FIG. 6D is a graph view illustrating an embodiment of user-perceived display screen brightness output along different angles relative to a display screen.
Figure 6E:
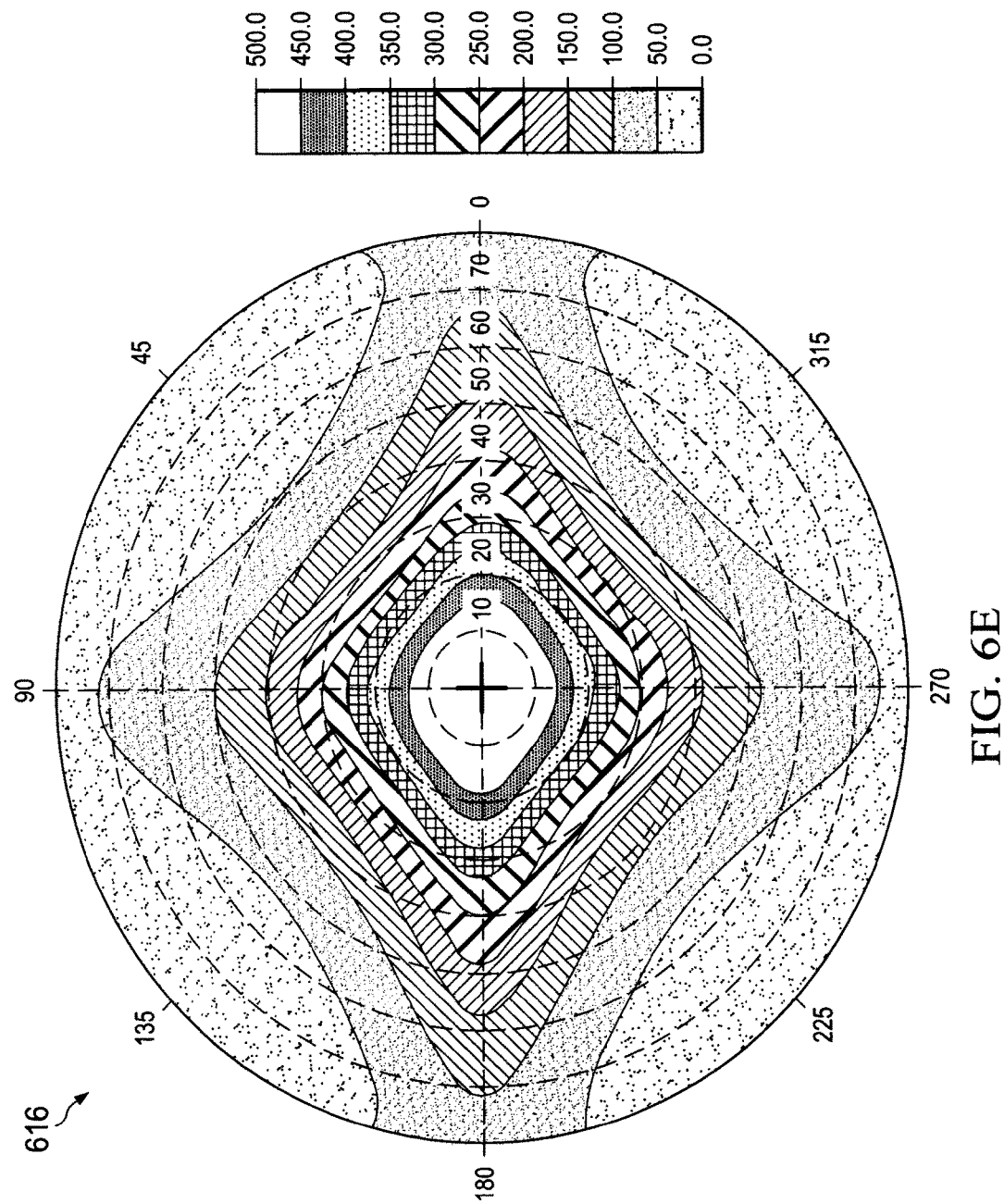
FIG. 6E is a graph view illustrating an embodiment of user-perceived display screen contrast output along different angles relative to a display screen.

The method 500 then proceeds to block 506 where one or more display screen output modifications are determined using the user viewing angle(s) determined at block 504. Referring now to FIGS. 6D and 6E, graphs of different user-perceived display screen output characteristics along different viewing angles are illustrated. FIG. 6D illustrates a brightness graph 614 that charts experimental embodiments of user-perceived brightness 614a on a Y-axis and viewing angles 614*b* (measured in a horizontal plane in this embodiment) on an X-axis. As can be seen, in an experimental embodiment using a non-polarized display screen, a user-perceived display screen brightness output 614*c* was generally maximized at viewing angles between 30 degrees on either size of the zero degree user viewing angle, and then dropped off outside of 30 degrees on either size of the zero degree user viewing angle. Similarly, in an experimental embodiment using a polarized display screen, a user-perceived display screen brightness output 614*d* was generally maximized at viewing angles between 30 degrees on either size of the zero degree user viewing angle, and then dropped off outside of 30 degrees on either size of the zero degree user viewing angle. While the graph in FIG. 6D illustrates user-perceived brightness as a function of viewing angle in a horizontal plane, one of skill in the art in possession of the present disclosure will recognize that user-perceived brightness as a function of viewing angle in a vertical plane is affected similarly as the viewing angle exceeds some amount.

FIG. 6E illustrates a contrast ratio graph 616 that charts an experimental embodiment of user-perceived contrast ratio at different viewing angles in 360 degrees. As can be seen, in that experimental embodiment, the user-perceived display screen contrast ratio output (indicated by different shading in the contrast ratio graph 616) was generally maximized at viewing angles between 15 degrees on either size of the zero degree user viewing angle, and then dropped off outside of 15 degrees on either size of the zero degree user viewing angle. The contrast ratio graph 616 provides an example of the 360 degree nature of the degradation in user-perceived display screen characteristics, and one of skill in the art in possession of the present disclosure will recognize that the brightness discussed above in FIG. 6D, as well as other user-perceived display screen output characteristics (e.g., color outputs such as color hue or color gamut), are affected by viewing angles in 360 degrees as well.

In an embodiment, at block 506 the user analysis engine 404 may provide the first user viewing angle 612 to the display screen output modification engine 406 in the viewing angle compensation engine 402, and the display screen output modification engine 406 may use the first user viewing angle 612 to determine one or more display screen output modifications. In some embodiments, there may be user viewing angles at which the display screen output modification engine 406 may determine that no display screen output modifications are necessary. For example, using the experimental embodiments illustrated and discussed above with reference to FIGS. 6D and 6E, the first user viewing angle 612 may have been determined to be less than 15 degrees from the zero degree user viewing angle (resulting in a generally maximized user-perceived display screen brightness output and user-perceived display screen contrast ratio output), and thus the display screen output modification engine 406 may determine that no display screen output modifications are necessary at block 506. With reference to FIG. 6A, such an example may result from the user 602 positioning themselves in the first user viewing angle orientation 600 such that their head 604 and eyes 606 are positioned directly above the secondary touch-sensitive monitor 308.

However, in some embodiments, viewing angles outside of a predetermined viewing angle from the zero degree user viewing angle, or any viewing angle greater than the zero degree viewing angle, may cause the display screen output modification engine 406 to determine display screen output modifications. For example, using the experimental embodiments illustrated and discussed above with reference to FIGS. 6D and 6E, the first user viewing angle 612 may have been determined to be more than 15 degrees from the zero degree user viewing angle (resulting in relatively large degradations of the user-perceived display screen brightness output and user-perceived display screen contrast ratio output), or at least some angle greater than the zero degree user viewing angle (resulting in at least some degradation of the user-perceived display screen brightness output and user-perceived display screen contrast ratio output), and thus the display screen output modification engine 406 may determine display screen output modifications at block 506.

At block 506, the display screen output modification engine 406 may use the first user viewing angle 612, other data received from or determined using the image(s) and/or data received at block 502, and any of a variety of other data or information discussed below to determine the display screen output modifications. For example, the first user viewing angle 612 may be utilized with display screen output characteristic graphs (e.g., the brightness graph 614 and contrast ratio graph 616 of FIGS. 6D and 6E), which may be stored in the display characteristics database 414 or accessed over a network, in order to determine the degradation of user-perceived display screen output characteristics at that first user viewing angle 612 and, in response determine or retrieve display screen output modifications that compensate for that degradation at the first user viewing angle 612. In other example, the display characteristics database 414 may include tables, charts, mappings, or other data structures that associate user viewing angles with display screen output modifications (which may be determined, for example, by testing the secondary touch-sensitive monitor 308 during manufacture), and the first user viewing angle 612 may be used to retrieve those display screen output modifications at block 506.

In yet another example, the display screen output modification engine 406 may be configured to determine the display screen output modifications "on-the-fly" using, for example, a user-perceived display screen output characteristic algorithm. In addition, any of the display screen output modification determination techniques discussed above may incorporate data received or retrieved from the ambient conditions sensors 410. For example, the ambient conditions sensors 410 may provide ambient light conditions and/or other ambient conditions known in the art, and the display screen output modification engine 406 may utilize those ambient light and/or other conditions to adjust, change, and/or otherwise determine the display screen output modifications at block 506. In addition, the display screen modification engine 406 may take into account features of the secondary touch-sensitive monitor 308 such as anti-reflective coatings, anti-glare coatings, and/or other features that can affect user-perceived display screen output characteristics. While a few specific examples of information and/or data that may be used in determining the display screen output modifications have been provided, one of skill in the art in possession of the present disclosure will recognize that any of a variety of information may be utilized in determining the display screen output modifications while remaining within the scope of the present disclosure, and a variety of different information and/or data may enhance the type of display screen output modifications that will provide various levels of compensation for the degradation of user-perceived display screen output characteristics at any particular user viewing angle.

In some embodiments, the display screen output modification determined at block 506 may include a display screen brightness output modification. For example, a change in display screen brightness output of the display screen may be determined based on the first user viewing angle, the ambient light conditions, and/or any other data or information available to the display screen output modification engine 406. With reference to FIG. 6D, an example of such a display screen brightness output modification may include determining that, for a first user viewing angle of 25 degrees from the zero degree user viewing angle that results in a user-perceived brightness of 1.3, the brightness of the display screen should be increased such that a brightness of 1.4 (e.g., the user-perceived brightness at the zero degree user viewing angle) is perceived at the first user viewing angle. In some embodiments, the display screen output modification determined at block 506 may include a display screen contrast output modification. For example, a change in display screen contrast output of the display screen may be determined based on the first user viewing angle, the ambient light conditions, and/or any other data or information available to the display screen output modification engine 406. With reference to FIG. 6E, an example of such a display screen brightness output modification may include determining that, for a first user viewing angle of 25 degrees from the zero degree user viewing angle that results in a user-perceived contrast ratio of 250, the contrast ratio of the display screen should be increased such that a user-perceived contrast ratio of 400 (e.g., the user-perceived contrast ratio at the zero degree user viewing angle) is perceived at the first user viewing angle.

In some embodiments, the display screen output modification determined at block 506 may include a display screen color output modification. For example, a change in display screen color output of the display screen may be determined based on the first user viewing angle, the ambient light conditions, and/or any other data or information available to the display screen output modification engine 406. An example of such a display screen color output modification may include determining that the color of pixels with an Red Green Blue (RGB) value of [100, 100, 100] at the zero degree viewing angle should be modified to [92, 95, 92] when the first user viewing angle is 25 degrees from the zero degree user viewing angle in order to maintain the color perceived by the user at the zero degree viewing angle. While a few examples have been provided, one of skill in the art in possession of the present disclosure will recognize that display screen brightness output, display screen contrast output, display screen color output, and/or other display screen outputs may be modified in different manners to achieve the compensation for the degraded display screen output characteristics at the user viewing angle. Furthermore, modifications to any of the display screen brightness output, display screen contrast output, display screen color output, and/or other display screen outputs may be determine in combination at block 506 to provide display screen output modifications for a plurality of display screen outputs that will result in the user perceiving the display screen output the same at the first user viewing angle 612 as they would at the zero degree viewing angle.

The method 508 then proceeds to block 508 where the display screen output modification(s) are applied to the display device to modify the one or more display screen outputs provided on the display screen. In an embodiment, the display screen output modification engine 406 may send the display screen output modification(s) determined at block 508 through the display device connector 412 and to the secondary touch-sensitive monitor 308. For example, the display screen output modification(s) may be sent to the secondary touch-sensitive monitor 308 using a video or graphics card, and in response to receiving the display screen output modification(s), the output of the display screen 308a on the secondary touch-sensitive monitor 308 may be adjusted according to those display screen output modification(s). As such, the display screen brightness output, display screen contrast output, display screen color output, other display screen outputs, and/or combinations thereof by the display screen 308a may be changed. In response, the user may perceive the display screen output at the first user viewing angle as having the same display screen output characteristics (e.g., brightness, contrast ratio, color, other characteristics, and/or combinations thereof) as would be perceived at the zero degree viewing angle without those display screen output modifications. The method 500 may then proceed back to block 502. As such, the method 500 may be performed periodically and/or continuously such that the image(s) are repeatedly received and analyzed to detect user(s) and determine user viewing angle(s) as those user viewing angle(s) change, and then those user viewing angle(s) used to determine display screen output modification(s) that are applied to the display device to repeatedly modify the display screen outputs as the user viewing angle(s) change. Thus, anytime the user adjusts their position relative to the secondary touch-sensitive monitor 308, the display screen outputs of its display screen 308a may be continuously changed such that the user-perceived display output characteristics remain the same as they would be perceived at the zero degree viewing angle without those display screen output modifications. Furthermore, in situations in which no users are detected in the images received at block 502, the display screen output may be set to a default level.

Figure 7A:
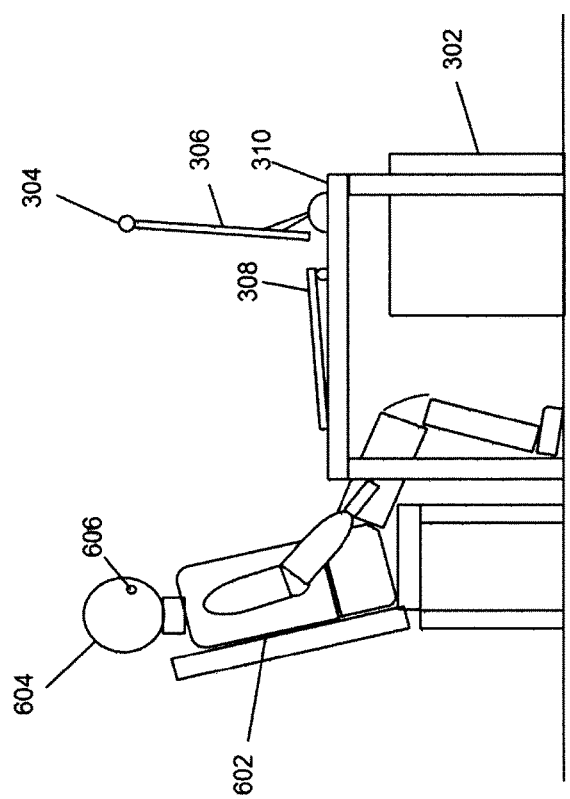
FIG. 7A is a schematic side view illustrating a user using the display device viewing angle compensation system of FIG. 3.
Figure 7B:
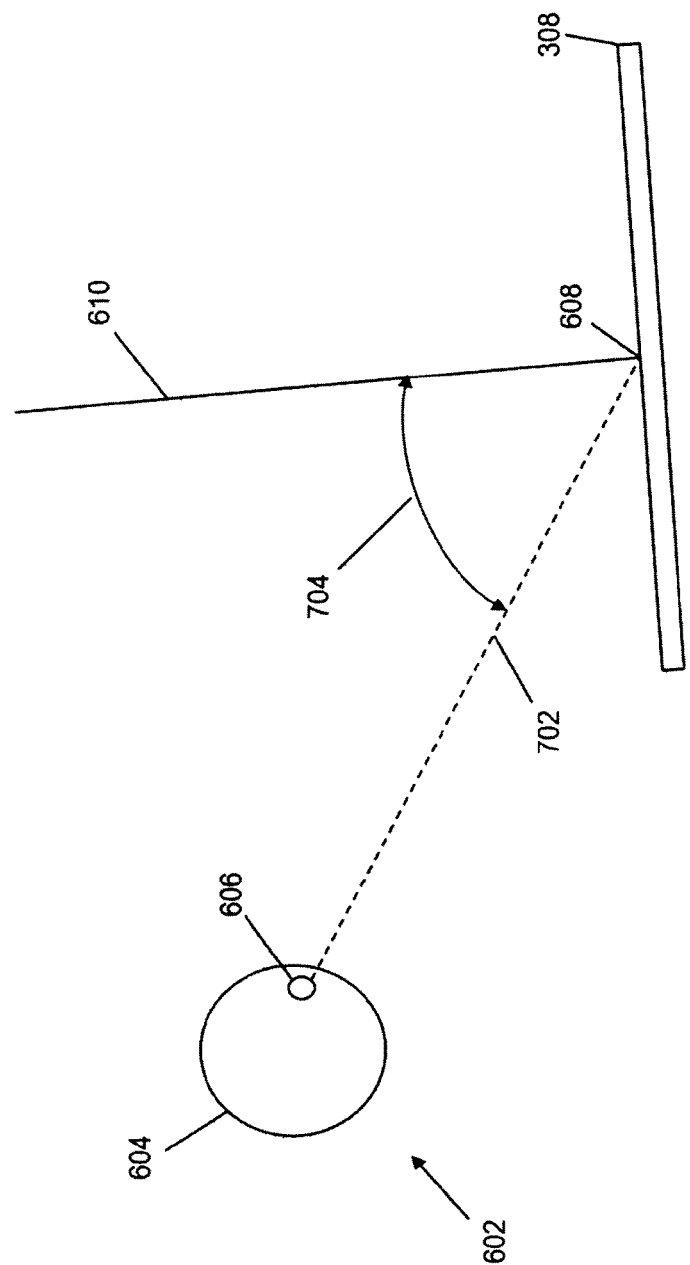
FIG. 7B is a schematic side view illustrating the user viewing a display device in the display device viewing angle compensation system of FIG. 7A.

A few examples of some of the functionality enabled by the systems and methods of the present disclosure will now be provided. However, those examples are not meant to be limiting, and one of skill in the art in possession of the present disclosure will recognize that a wide variety of functionality is enabled by the systems and methods of the present disclosure and thus will fall within its scope. Referring first to FIGS. 7A, 7B, and 7C, an embodiment of a second user viewing angle orientation 700 is illustrated in which the user 602 is using the display device viewing angle compensation system 300 in the second user viewing angle orientation 700. In the embodiment illustrated in FIG. 7A, the user 602 is illustrated utilizing the secondary touch-sensitive monitor 308 in the second user viewing angle orientation 700 such that user 602 is leaning back from the surface 310 (i.e., the desk) such that the head 604 of the user 602 is positioned away from the display screen 308a of the secondary touch-sensitive monitor 308 and the eyes 606 of the user 602 are looking at the display screen 308a. Thus, the second user viewing angle orientation 700 may follow the first user viewing angle orientation 600 illustrated in FIGS. 6A-C when the user 602 has (at least temporarily) finished performing some work using the secondary touch-sensitive monitor 308 and may be leaning back and viewing the work product on the primary monitor 306 and/or the secondary touch-sensitive monitor 308.

FIGS. 7B and 7C illustrate different views of the user 602 utilizing the secondary touch-sensitive monitor 308 in the second user viewing angle orientation 700 illustrated in FIG. 7A. FIG. 7B illustrates a side view of the relative position of the head 604 of the user 602 and the secondary touch-sensitive monitor 308, as well as the eyes 606 of the user 602 viewing the portion 608 of the display screen 308a on the secondary touch sensitive monitor 308 along a second user viewing path 702. As such, FIG. 7B illustrates a second user viewing angle 704 that is measured between the second user viewing path 702 and the reference viewing angle line 610. FIG. 7C illustrates a top view of the relative position of the head 604 of the user 602 and the secondary touch-sensitive monitor 308, as well as the eyes 606a and 606b of the user 602 viewing the portion 608 of the display screen 308a on the secondary touch sensitive monitor 308 along the second user viewing path 702. Similarly as discussed above with FIGS. 6A-C, while the second viewing angle 702 is illustrated in FIG. 7B as being measured along a single plane (i.e., a vertical plane that is parallel to both of the side edges of the display screen 308a), one of skill in the art in possession of the present disclosure will recognize that the second user viewing angle may include a vertical component (e.g., measured along a vertical plane that is parallel to both of the side edges of the display screen 308a) and a horizontal component (e.g., measured along a horizontal plane that is parallel to both of the top edge and the bottom edge of the display screen 308a).

Thus, FIGS. 7A-C, with reference to FIGS. 6A-C, illustrate how the user 602 may view the same portion 608 of the display screen 308a in two different user viewing angle orientations 600 and 700, and how doing so may cause a first user viewing angle 612 to increase to a second user viewing angle 702. As discussed above (e.g., with reference to FIGS. 6D-E), such an increase in user viewing angle causes the user-perceived display screen output characteristics to degrade. For example, the second user viewing angle 702 may be approximately 55 degrees, which can cause the user-perceived display screen brightness output to degrade from 1.4 (at the zero degree viewing angle) to 1.0 (according to the brightness graph 614 in FIG. 6D), and can cause the user-perceived display screen contrast ratio output to degrade from 400 (at the zero degree viewing angle) to 45 (according to the contrast ratio graph 616 in FIG. 6E). However, as described above, the method 500 will operate to determine the second user viewing angle 702 and associated display screen output modifications, and apply those display screen output modifications to the secondary touch-sensitive monitor 308 such that the user will perceive the display screen output characteristics (e.g., user-perceived display screen brightness output, contrast ratio output, color output, etc.) at the second user viewing angle 702 as having the same display screen output characteristics as were perceived at the first user viewing angle 612, which may have been the same as they were (or would have been) perceived at the zero degree viewing angle without those display screen output modifications.

Figure 7D:
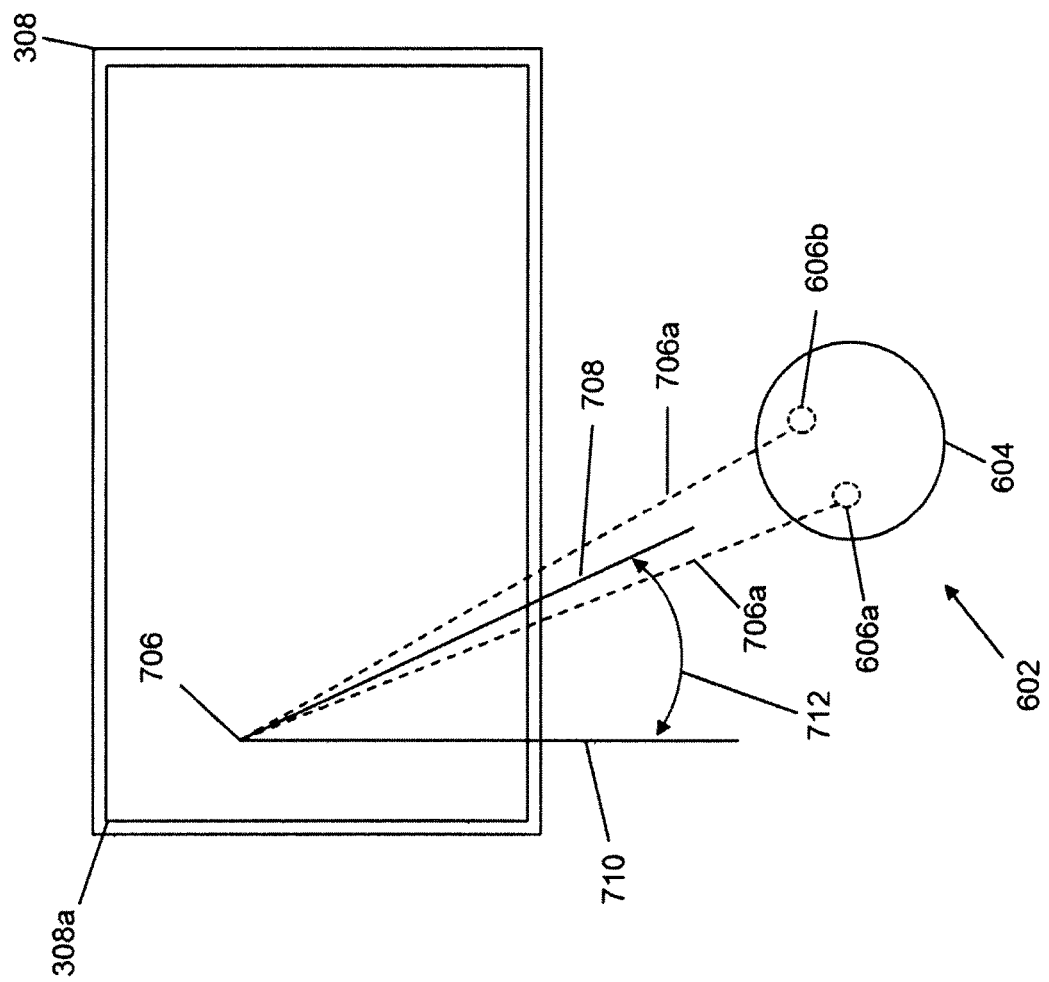
FIG. 7D is a schematic top view illustrating the user viewing a display device in the display device viewing angle compensation system of FIG. 7A.

Referring now to FIG. 7D, an embodiment of the user 602 viewing a different portion (relative to the portion 608) of the display screen 308a on the secondary touch-sensitive monitor 308 is illustrated. FIG. 7D illustrates a top view of the relative position of the head 604 of the user 602 and the secondary touch-sensitive monitor 308, as well as the eyes 606a and 606b of the user 602 viewing a portion 706 of the display screen 308a on the secondary touch sensitive monitor 308 along a second user viewing path 708a. Similarly as discussed above, the zero degree user viewing angle may be defined as a viewing angle that is perpendicular to the display screen 308a, and that zero degree viewing angle is illustrated in FIG. 7D by a reference viewing angle line 710. As such, FIG. 7D illustrates a third user viewing angle 712 that is measured between the first user viewing path 706a (which is approximated in the illustrated embodiment by a line 708 that is the average of the second user viewing path 706a from each eye 606a and 606b on the user 602, but which may be determined in a variety of other manners while remaining within the scope of the present disclosure) and the reference viewing angle line 710. Thus, FIGS. 7B and 7D illustrate how the user viewing angle may include a horizontal component (e.g., the third user viewing angle 712) and a vertical component (e.g., the second user viewing angle 704), and as discussed above, each of those user viewing angles may result in different degradation components of the total degradation in the user-perceived display screen output characteristics.

In a specific embodiment, FIGS. 7A-D illustrated how the user may change orientations by looking at different portions on the display screen 308a of the secondary touch-sensitive monitor 308, and as discussed above, that change in orientation can result in degradations of the user-perceived display screen output characteristics. However, as described above, the method 500 will operate to determine the second user viewing angle 702 and the third user viewing angle 712, determine the associated display screen output modifications for those viewing angles, and apply those display screen output modifications to the secondary touch-sensitive monitor 308 such that the user will perceive the display screen output characteristics (e.g., user-perceived display screen brightness output, contrast ratio output, color output, etc.) at the second user viewing angle 702 and the third user viewing angle 712 as having the same display screen output characteristics as were perceived at the first user viewing angle 612, which may have been the same as they were (or would have been) perceived at the zero degree viewing angle without those display screen output modifications.

Continuing with the example discussed above with reference to FIG. 7D, FIG. 7E illustrated an embodiment of an additional user 714 having a head 716 with eyes 718a and 718b that are viewing a portion 720 of the display screen 308a along a fourth user viewing path 722. For example, the additional user 714 may be positioned behind or next to the user 602 illustrated in FIG. 7A (e.g., the additional user 714 may walk up behind the user 602 and review the information or data displayed on the secondary touch-sensitive monitor 308.) In some embodiments, the viewing angle compensation engine 402 may be configured to ignore the additional user 714. For example, the user analysis engine 404 may receive the image(s) at block 502 as discussed above, and detect both the user 602 and the additional user 714 in those image(s). However, the viewing angle compensation engine 402 may be configured to only determine display screen output modifications at block 506 for a single detected user and their user viewing angle (e.g., the user that is determined to be closest to the display screen 308a, a defined or authorized user that may be detected (e.g., using facial recognition techniques) in the image(s), and/or using a variety of other filtering criteria). As such, the display screen output modification engine 406 may be configured to ignore the additional user 714.

However, in some embodiments, the viewing angle compensation engine 402 may be configured to adjust the user-perceived display screen output characteristics to compensate for the user viewing angles of the user 602 and the additional user 714. For example, the user analysis engine 404 may receive the image(s) at block 502 as discussed above, and detect both the user 602 and the additional user 714 in those image(s). Then, substantially as discussed above, the user analysis engine 404 may be configured to determine a (different) user viewing angle for the each of the user 602 and the additional user 714. As discussed above, each of those user viewing angles may be associated with different degradations of the user-perceived display screen output characteristics, and at block 506, the display screen output modification engine 406 may determine display screen output modifications for each of those user viewing angles substantially as discussed above. The display screen output modification engine 406 may then combine, adjust, or otherwise adapt those display screen output modifications in order to provide display screen output modifications that will modify the display screen output in a manner that will optimize the user-perceived display screen output characteristics for both of the user 602 and the additional user 714.

For example, the display screen output modification engine 406 may average the display screen output modifications determined for each of the user viewing angles, and provide those averaged display screen output modifications to the secondary touch-sensitive monitor 308 at block 508. In a specific example, the user 602 and the additional user 714 may be viewing the same portion of the display screen 308a, and pixels with an RGB color value of [100,100,100] at the zero degree viewing angle may be associated with an display screen color output modification that provides an RGB value of [95, 91, 95] according to the user viewing angle of the user 602, and with an display screen color output modification that provides an RGB value of [89, 87, 89] according to the user viewing angle of the additional user 714. As such, the averaged display screen output modification may be determined that provides an RGB value of [92, 89, 92].

In another example, the display screen output modification engine 406 may provide different weights to the display screen output modifications determined for each of the user viewing angles (e.g., weighing the display screen output modifications for the user that is determined to be closer to the display screen 308a higher than the display screen output modifications for the user that is determined to be further from the display screen 308a, weighing the display screen output modifications for a facially recognized authorized user higher than the display screen output modifications for a non-recognized/non-authorized user, etc.) before combining the display screen output modifications, and provide those combined display screen modifications to the secondary touch-sensitive monitor 308 at block 508. As such, the display screen output modification engine 406 may be configured to compensate for viewing angle degradations experienced by a plurality of users. While a few examples of the determination of display screen modifications for two users have been provided, a variety of different display screen modifications for two or more users may be provided while remaining within the scope of the present disclosure.

Figure 8:
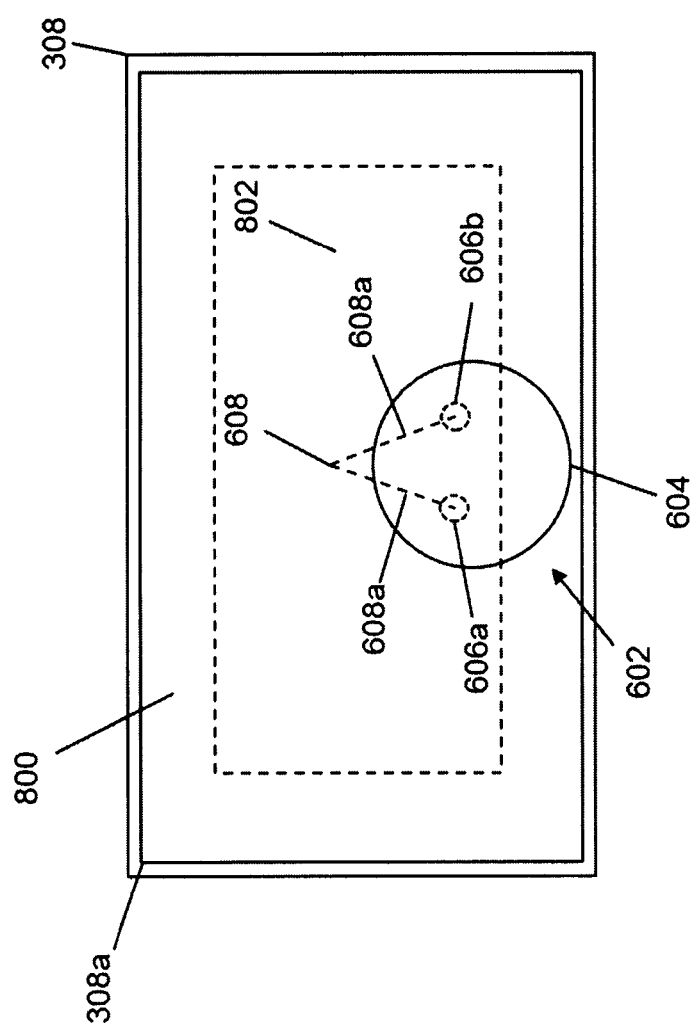
FIG. 8 is a schematic top view illustrating a display device modification in response to the user viewing the display device in the display device viewing angle compensation system of FIG. 6C.
Figure 9:
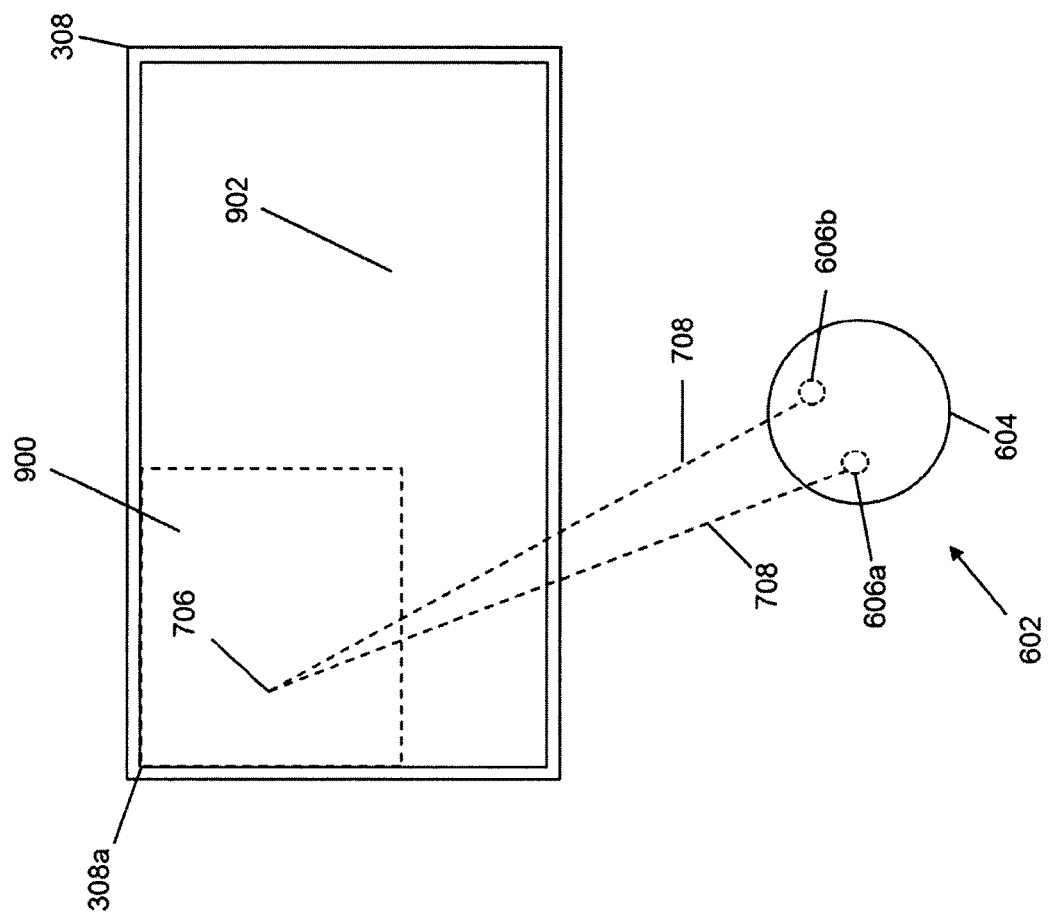
FIG. 9 is a schematic top view illustrating a display device modification in response to the user viewing the display device in the display device viewing angle compensation system of FIG. 7D.
Figure 10:
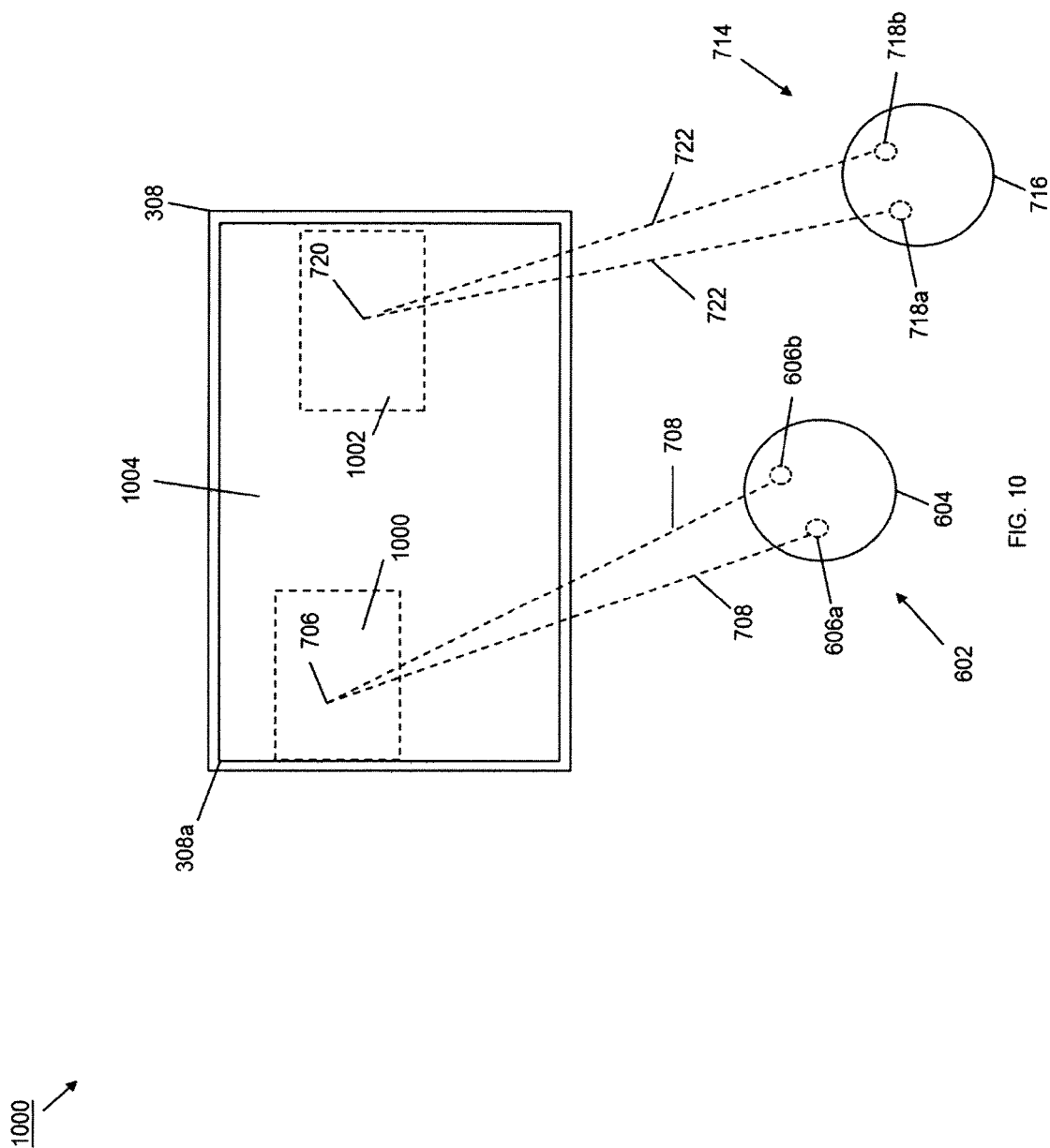
FIG. 10 is a schematic top view illustrating a display device modification in response to the user and the additional user viewing the display device in the display device viewing angle compensation system of FIG. 7E.

Referring now to FIGS. 8, 9, and 10, different embodiments of the application of display screen output modification(s) that modify display screen output(s) provided on the display screen are illustrated. With reference to FIGS. 6A-C, FIG. 8 illustrates different sections 800 and 802 of the display screen 308a on the secondary touch-sensitive monitor 308 for which the display screen output(s) may be modified. In an embodiment, with the user 602 detected as viewing the portion 608 of the display screen 308a, the display screen output modifications may be determined for and applied to the perimeter (i.e., the section 800) of the display screen 308a while not being applied to the center (i.e., the section 802) of the display screen 308a. For example, when the head 604 of the user 602 is detected close to the display screen 308a and viewing a centrally located portion 608 of the display screen, the display screen outputs of the perimeter of the display screen 308a may be modified such that the section 800 of the display screen 308a in the peripheral vision of the user 602 is modified.

With reference to FIG. 7D, FIG. 9 illustrates sections 900 and 902 of the display screen 308a on the secondary touch-sensitive monitor 308 for which the display screen output(s) may be modified. In an embodiment, with the user 602 detected as viewing the portion 706 of the display screen 308a, the display screen output modifications may be determined for and applied to the section 900 of the display screen 308a while not being applied to the section 902 of the display screen 308a. For example, when the user 602 is detected as viewing a corner portion 706 of the display screen, the display screen outputs of an area in that corner of the display screen 308a may be modified such that only the section 900 of the display screen 308a is modified. Similarly, with reference to FIG. 7E, FIG. 10 illustrates sections 1000, 1002, and 1004 of the display screen 308a on the secondary touch-sensitive monitor 308 for which the display screen output(s) may be modified. In an embodiment, with the user 602 and the additional user 714 detected as viewing the portions 706 and 720, respectively, of the display screen 308a, the display screen output modifications may be determined for and applied to the sections 1000 and 1002 of the display screen 308a while not being applied to the section 1004 of the display screen 308a. As discussed above, each of the sections 1000 and 1002 may be modified by an average or combination of display screen output modifications determined using the user viewing angles for each of the user 602 and the additional user 714. However, the sections 1000 and 1002 may also be modified by separate display screen output modifications (e.g., a first display screen output modification determined using the user viewing angle for the user 602 and applied to the section 1000, and a second display screen output modification determined using the user viewing angle for the additional user 714 and applied to the section 1002) while remaining within the scope of the present disclosure.

Thus, systems and methods have been described that compensate for user viewing angles with a display screen on a display device that degrade the user-perceived output characteristics of the display screen. The systems and methods determine the user viewing angle at which a user is viewing the display screen, and are able to use that user viewing angle to determine modifications to the display screen output. With those modification applied to the display device, the user-perceived output characteristics of the display screen at that user viewing angle will be substantially the same as they would if the user were viewing the display screen at a relatively small angle that is not associated with user-perceived display screen output degradation. The systems and methods allow for a user to view a display screen at any of a variety of user viewing angles while still being able to perceive that display screen as having the same display screen output characteristics, which provides a better user experience with the display device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A display device viewing angle compensation system, comprising:
a first display device including a first display screen;
a camera;

a processor that is coupled to the first display device and the camera; and a memory system that is coupled to the processor and that includes instructions that, when executed by the processor, cause the processor to provide a viewing angle compensation engine that is configured to:

receive a first image from the camera;

analyze the first image to detect a first user and determine, by tracking first user eyes of the first user, a first viewing direction of the first user eyes of the first user;

identify a first portion of the first display screen actually being viewed by the first user based on the first viewing direction of the first user eyes of the first user, and a first viewing angle of the first user eyes relative to the first portion of the first display screen, wherein the first viewing angle is greater than a zero degree user viewing angle and less than a predetermined viewing angle threshold;

determine first display screen viewing characteristics perceived by the first user when viewing a first display screen output provided on the first portion of the first display screen at the first viewing angle, wherein the first display screen viewing characteristics are different than display screen viewing characteristics at the zero degree user viewing angle;

analyze the first image to detect a second user and determine, by tracking second user eyes of the second user, a second viewing direction of the second user eyes of the second user;

identify a second portion of the first display screen actually being viewed by the second user based on the second viewing direction of the second user eyes of the second user, and a third viewing angle of the second user eyes relative to the second portion of the first display screen that is distinct from the first portion of the first display screen, wherein the third viewing angle is greater than the zero degree user viewing angle and less than the predetermined viewing angle threshold;

determine second display screen viewing characteristics perceived by the second user when viewing a second display screen output provided on the second portion of the first display screen at the third viewing angle, wherein the second display screen viewing characteristics are different than the display screen viewing characteristics at the zero degree user viewing angle;

receive a second image from the camera;

analyze the second image to detect the first user and determine, by tracking the first user eyes of the first user, a second viewing angle of the first user eyes of the first user relative to the first portion of the first display screen when viewing the first display screen output provided on the first portion of the first display screen at the second viewing angle, wherein the second viewing angle is at least the predetermined viewing angle threshold;

analyze the second image to detect the second user and determine, by tracking the second user eyes of the second user, a fourth viewing angle of the second user eyes of the second user relative to the second portion of the first display screen, wherein the fourth viewing angle is at least the predetermined viewing angle threshold;

determine at least one first display screen output modification using the second viewing angle of the first user eyes and the first display screen viewing characteristics;

determine at least one second display screen output modification using the fourth viewing angle of the second user eyes and the second display screen viewing characteristics;

apply the at least one first display screen output modification to the first display device to modify the first display screen output provided on the first portion of the first display screen such that the first user perceives the first display screen viewing characteristics when viewing the first portion of the first display screen at the second viewing angle; and apply the at least one second display screen output modification to the first display device to modify the second display screen output provided on the second portion of the first display screen such that the second user perceives the second display screen viewing characteristics when viewing the second portion of the first display screen at the fourth viewing angle, wherein the at least one first display screen output modification and the at least one second display screen output modification includes at least one of a brightness output modification that is configured to modify a brightness output provided on the first display screen, a contrast output modification that is configured to modify a contrast output provided on the first display screen, and a color output modification that is configured to modify a color output provided on the first display screen, and wherein the at least one first display screen output modification is different from the at least one second display screen output modification.

2. The display device viewing angle compensation system of claim 1, wherein the analyzing the first image to detect the first user includes detecting a distance of the first user from the first display screen, wherein the distance of the first user from the first display screen is used to determine the first viewing angle of the first user eyes relative to the first display screen.

3. The display device viewing angle compensation system of claim 1, wherein the first viewing angle is associated with first user-perceived display screen output degradation.

4. The display device viewing angle compensation system of claim 1, wherein the modifying the first display screen output provided on the first portion of the first display screen includes modifying the first display screen output provided on the first portion of the first display screen while a third display screen output on a third portion of the first display screen remains unmodified.

5. The display device viewing angle compensation system of claim 1, wherein the receiving the first image from the camera is in response to the first user performing some work on the first display screen output.

6. The display device viewing angle compensation system of claim 1, wherein the predetermined viewing angle threshold is 15 degrees from the zero degree user viewing angle.

7. An information handling system (IHS), comprising:
a first display screen output connector;
a camera input;
a processor that is coupled to the first display screen output connector and the camera input; and
a memory system that is coupled to the processor and that includes instructions that, when executed by the processor, cause the processor to provide a viewing angle compensation engine that is configured to:
receive a first image from the camera input;
analyze the first image to detect a first user and determine, by tracking first user eyes of the first user, a first viewing direction of the first user eyes of the first user;
identify a first portion of a first display screen that is actually being viewed by the first user eyes and that is coupled to the first display screen output connector based on the first viewing direction of the first user eyes of the first user, and a first viewing angle of the first user eyes relative to the first portion of the first display screen, wherein the first viewing angle is greater than a zero degree user viewing angle and less than a predetermined viewing angle threshold;
determine first display screen viewing characteristics perceived by the first user at the first viewing angle when viewing a first display screen output provided on the first portion of the first display screen at the first viewing angle, wherein the first display screen viewing characteristics are different than display screen viewing characteristics at the zero degree user viewing angle;
analyze the first image to detect a second user and determine, by tracking second user eyes of the second user, a second viewing direction of the second user eyes of the second user;
identify a second portion of the first display screen actually being viewed by the second user based on the second viewing direction of the second user eyes of the second user, and a third viewing angle of the second user eyes relative to the second portion of the first display screen that is distinct from the first portion of the first display screen, wherein the third viewing angle is greater than the zero degree user viewing angle and less than the predetermined viewing angle threshold;
determine second display screen viewing characteristics perceived by the second user when viewing a second display screen output provided on the second portion of the first display screen at the third viewing angle, wherein the second display screen viewing characteristics are different than the display screen viewing characteristics at the zero degree user viewing angle;
receive a second image from the camera input;
analyze the second image to detect the first user and determine, by tracking the first user eyes of the first user, a second viewing angle of the first user eyes of the first user relative to the first portion of the first display screen when viewing the first display screen output provided on the first portion of the first display screen at the second viewing angle, wherein the second viewing angle is at least the predetermined viewing angle threshold;
analyze the second image to detect the second user and determine, by tracking the second user eyes of the second user, a fourth viewing angle of the second user eyes of the second user relative to the second portion of the first display screen, wherein the fourth viewing angle is at least the predetermined viewing angle threshold;
determine at least one first display screen output modification using the second viewing angle of the first user and the first display screen viewing characteristics;
determine at least one second display screen output modification using the fourth viewing angle of the second user and the second display screen viewing characteristics;
provide the at least one first display screen output modification through the first display screen output to modify the first display screen output provided on the first portion of the first display screen such that the first user perceives the first display screen viewing characteristics when viewing the first portion of the first display screen at the second viewing angle; and
provide the at least one second display screen output modification through the first display screen output to modify the second display screen output provided on the second portion of the first display screen such that the second user perceives the second display screen viewing characteristics when viewing the second portion of the first display screen at the second viewing angle,
wherein the at least one first display screen output modification and the at least one second display screen output modification includes at least one of brightness output modification that is configured to modify a brightness output provided on the first display screen, a contrast output modification that is configured to modify a contrast output provided on the first display screen, and a color output modification that is configured to modify a color output provided on the first display screen, and
wherein the at least one first display screen output modification is different from the at least one second display screen output modification.

8. The IHS of claim 7, wherein the analyzing the first image to detect the first user includes detecting a distance of the first user from the first display screen,
wherein the distance of the first user from the first display screen is used to determine the first viewing angle of the first user eyes relative to the first display screen.

9. The IHS of claim 7, wherein the first viewing angle is associated with first user-perceived display screen output degradation.

10. The IHS of claim 7, wherein the modifying the first display screen output provided on the first portion of the first display screen includes modifying the first display screen output provided on the first portion of the first display screen while a third display screen output on a third portion of the first display screen remains unmodified.

11. The IHS of claim 7, wherein the receiving the first image from the camera input is in response to the first user performing some work on the first display screen output.

12. The IHS of claim 7, wherein the predetermined viewing angle threshold is 15 degrees from the zero degree user viewing angle.

13. A method for compensating for viewing angle with a display device, comprising:
receiving, by a processor, a first image from a camera;
analyzing, by the processor, the first image to detect a first user and determine, by tracking first user eyes of the first user, a first viewing direction of the first user eyes of the first user;
identifying, by the processor, a first portion of a first display screen actually being viewed by the first user based on the first viewing direction of the first user eyes of the first user, and a first viewing angle of the first user eyes relative to the first portion of the first display screen, wherein the first viewing angle is greater than a zero degree user viewing angle and less than a predetermined viewing angle threshold;

determining, by the processor, first display screen viewing characteristics perceived by the first user when viewing a first display screen output provided on the first portion of the first display screen at the first viewing angle, wherein the first display screen viewing characteristics are different than display screen viewing characteristics at the zero degree user viewing angle;

analyzing, by the processor, the first image to detect a second user and determine, by tracking second user eyes of the second user, a second viewing direction of the second user eyes of the second user;

identifying, by the processor, a second portion of the first display screen actually being viewed by the second user based on the second viewing direction of the second user eyes of the second user, and a third viewing angle of the second user eyes relative to the second portion of the first display screen, wherein the third viewing angle is greater than the zero degree user viewing angle and less than the predetermined viewing angle threshold;

determining, by the processor, second display screen viewing characteristics perceived by the second user when viewing a second display screen output provided on the first portion of the first display screen at the third viewing angle, wherein the second display screen viewing characteristics are different than the display screen viewing characteristics at the zero degree user viewing angle;

receiving, by the processor, a second image from the camera;

analyzing, by the processor, the second image to detect the first user and determine, by tracking the first user eyes of the first user, a second viewing angle of the first user eyes relative to the first display screen when viewing the first display screen output provided on the first portion of the first display screen at the second viewing angle, wherein the second viewing angle is at least the predetermined viewing angle threshold;

determining, by the processor, at least one first display screen output modification using the second viewing angle of the first user eyes and the first display screen viewing characteristics;

analyzing, by the processor, the second image to detect the second user and determining, by tracking the second user eyes of the second user, a fourth viewing angle of the second user eyes relative to the second portion of the first display screen, wherein the fourth viewing angle is at least the predetermined viewing angle threshold;

determining, by the processor, at least one second display screen output modification using the fourth viewing angle of the second user and the second display screen viewing characteristics;

applying, by the processor, the at least one first display screen output modification to the first display screen to modify the first display screen output provided on the first portion of the first display screen such that the first user perceives the first display screen viewing characteristics when viewing the first portion of the first display screen at the second viewing angle; and applying, by the processor, the at least one second display screen output modification to the first display screen to modify the second display screen output provided on the second portion of the first display screen such that the second user perceives the second display screen viewing characteristics when viewing the second portion of the first display screen at the second viewing angle, wherein the at least one first display screen output modification and the at least one second display screen output modification includes at least one of a brightness output modification that modifies a brightness output provided on the first display screen, a contrast output modification that modifies a contrast output provided on the first display screen, and a color output modification that modifies a color output provided on the first display screen, and wherein the at least one first display screen output modification is different from the at least one second display screen output modification.

14. The method of claim 13, wherein the receiving, by the processor, the first image from the camera is in response to the first user performing some work on the first display screen output.

15. The method of claim 13, wherein the analyzing the first image to detect the first user includes detecting a distance of the first user from the first display screen, wherein the distance of the first user from the first display screen is used to determine the first viewing angle of the first user eyes relative to the first display screen.

16. The method of claim 13, wherein the first viewing angle is associated with first user-perceived display screen output degradation.

17. The method of claim 13, wherein the modifying the first display screen output provided on the first portion of the first display screen includes modifying the first display screen output provided on the first portion of the first display screen while a third display screen output on a third portion of the first display screen remains unmodified.

18. The method of claim 13, wherein the predetermined viewing angle threshold is 15 degrees from the zero degree user viewing angle.

* * * * *